(12) United States Patent
Manome

(10) Patent No.: US 11,986,952 B2
(45) Date of Patent: May 21, 2024

(54) VERTICAL ARTICULATED ROBOT

(71) Applicant: YAMAHA HATSUDOKI KABUSHIKI KAISHA, Iwata (JP)

(72) Inventor: Toshifumi Manome, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 6 days.

(21) Appl. No.: 17/761,965

(22) PCT Filed: Sep. 25, 2019

(86) PCT No.: PCT/JP2019/037655
§ 371 (c)(1),
(2) Date: Mar. 18, 2022

(87) PCT Pub. No.: WO2021/059405
PCT Pub. Date: Apr. 1, 2021

(65) Prior Publication Data
US 2022/0339802 A1 Oct. 27, 2022

(51) Int. Cl.
  *B25J 19/00* (2006.01)
  *B25J 9/10* (2006.01)
(52) U.S. Cl.
  CPC .......... *B25J 19/0029* (2013.01); *B25J 9/102* (2013.01); *B25J 19/0004* (2013.01)
(58) Field of Classification Search
  CPC ..... B25J 19/0004; B25J 19/0029; B25J 9/102
  See application file for complete search history.

(56) References Cited

U.S. PATENT DOCUMENTS

2014/0137687 A1 * 5/2014 Nogami ............... B25J 19/0004
                                                                901/23

FOREIGN PATENT DOCUMENTS

| CN | 102085658 A | 6/2011 |
|---|---|---|
| CN | 102686368 A | 9/2012 |
| CN | 102729247 A | 10/2012 |
| CN | 103112003 A | 5/2013 |
| CN | 103817708 A | 5/2014 |
| CN | 113910291 A | 1/2022 |
| JP | H06-320471 A | 11/1994 |
| JP | H07-124887 A | 5/1995 |
| JP | 2004-174704 A | 6/2004 |
| JP | 2013-035098 A | 2/2013 |
| JP | 5257263 B2 | 8/2013 |
| JP | 2014-151412 A | 8/2014 |

(Continued)

OTHER PUBLICATIONS

An Office Action; "Notice of Reasons for Refusal," mailed by the Japanese Patent Office on Nov. 1, 2022, which corresponds to Japanese Patent Application No. 2021-548053 and is related to U.S. Appl. No. 17/761,965; with English language translation.

(Continued)

*Primary Examiner* — Charles A Fox
*Assistant Examiner* — Gregory T Prather
(74) *Attorney, Agent, or Firm* — Studebaker & Brackett PC

(57) ABSTRACT

A vertical articulated robot includes a plurality of joint axis portion units configured to rotationally drive a plurality of arms, and a wiring unit configured to allow wiring portions of the plurality of joint axis portion units to be arranged therein. A joint axis portion unit integrally includes a first motor including a solid first motor shaft and a first speed reducer directly connected to the first motor shaft.

16 Claims, 22 Drawing Sheets

(56) References Cited

FOREIGN PATENT DOCUMENTS

| JP | 2015-171746 A | 10/2015 |
|---|---|---|
| JP | 2017-213670 A | 12/2017 |
| KR | 10-0460083 B1 | 12/2004 |

OTHER PUBLICATIONS

International Search Report issued in PCT/JP2019/037655; mailed Dec. 17, 2019.
Written Opinion issued in PCT/JP2019/037655; mailed Dec. 17, 2019.
International Preliminary Report on Patentability issued in PCT/JP2019/037655; mailed Oct. 2, 2020.
An Office Action mailed by China National Intellectual Property Administration on Aug. 1, 2023, which corresponds to Chinese Patent Application No. 201980100630.7 and is related to U.S. Appl. No. 17/761,965.
An Office Action mailed by China National Intellectual Property Administration on Feb. 29, 2024, which corresponds to Chinese Patent Application No. 201980100630.7 and is related to U.S. Appl. No. 17/761,965; with English language translation.

* cited by examiner (FIRST EMBODIMENT)

FIG.3  FIRST JOINT AXIS PORTION UNIT

FIRST JOINT AXIS PORTION UNIT

FIG.9  SECOND JOINT AXIS PORTION WIRING UNIT

MOTOR UNIT OF FOURTH JOINT AXIS PORTION

FIFTH AND SIXTH JOINT AXIS PORTION UNIT (ASSEMBLED STATE)

(SECOND EMBODIMENT)

(SECOND EMBODIMENT)

(SECOND EMBODIMENT)

(SECOND EMBODIMENT)

THIRD JOINT AXIS PORTION UNIT

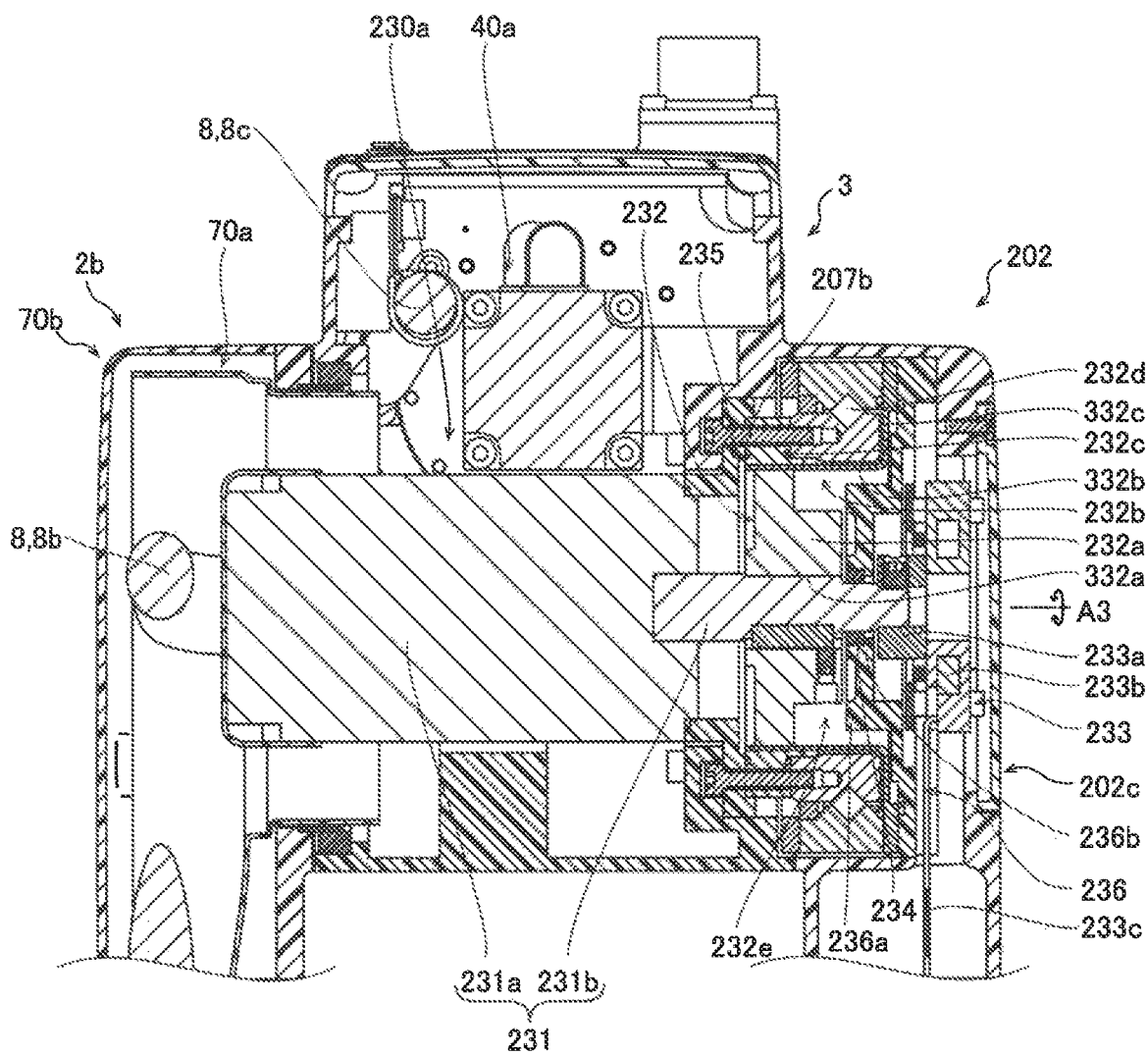

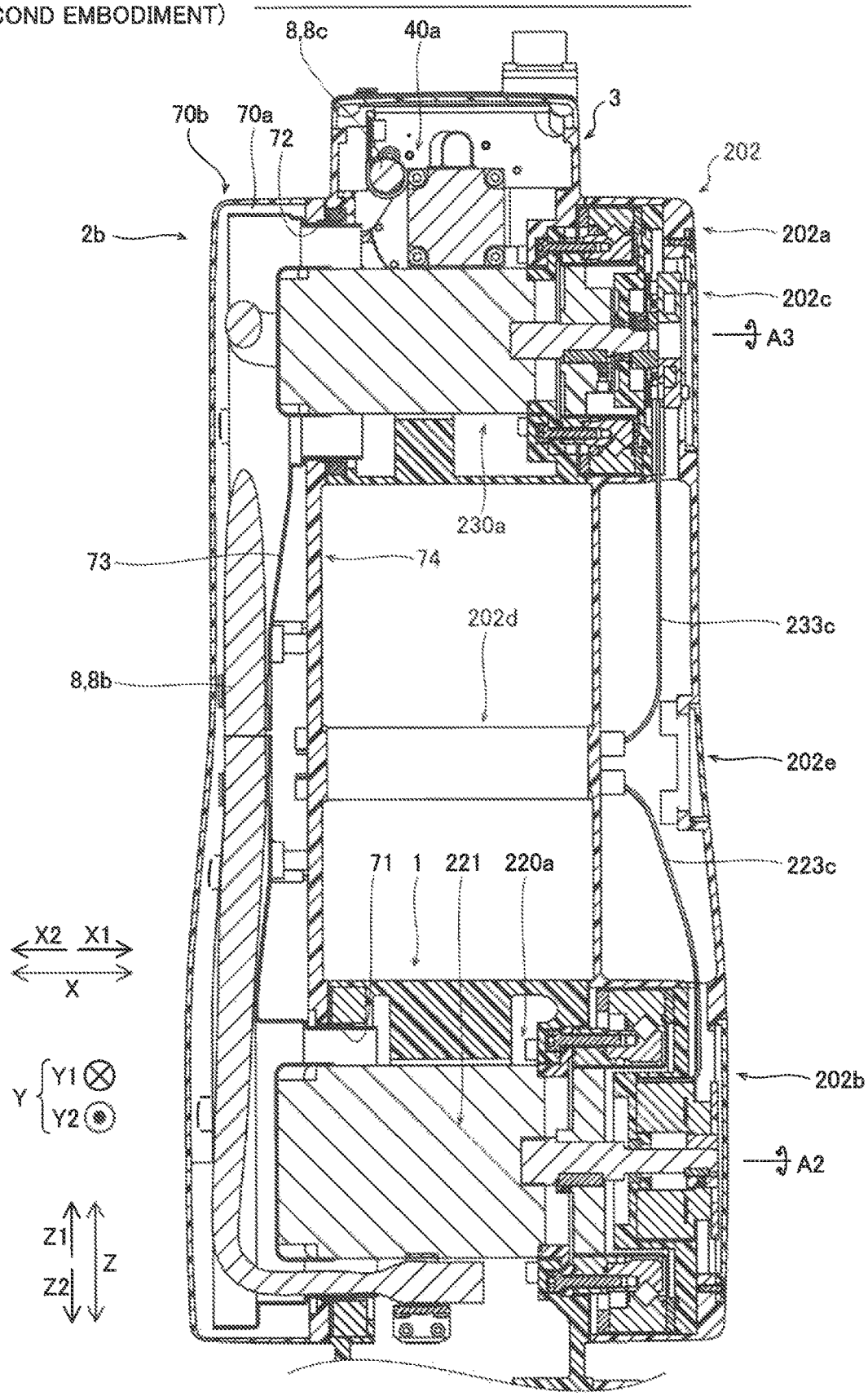
FIG.22 (SECOND EMBODIMENT)

VERTICAL ARTICULATED ROBOT

CROSS-REFERENCE TO RELATED APPLICATION

This application is a National Stage of International Patent Application No. PCT/JP2019/037655, filed Sep. 25, 2019, the entire content of which is incorporated herein by reference.

BACKGROUND

Technical Field

The present disclosure relates to a vertical articulated robot, and more particularly, it relates to a vertical articulated robot including a motor and a speed reducer.

Background Art

Conventionally, a vertical articulated robot including a motor and a speed reducer is known. Such a vertical articulated robot is disclosed in Japanese Patent No. 5257263, for example.

Japanese Patent No. 5257263 discloses a seven-axis vertical articulated robot. Each of the seven joint axes of this vertical articulated robot includes an actuator with a built-in speed reducer including a hollow portion in an output shaft. Wiring such as power lines and signal lines is inserted through the hollow portion of the output shaft of the actuator with a built-in speed reducer.

SUMMARY

However, in the vertical articulated robot described in Japanese Patent No. 5257263, the wiring is inserted through the hollow portion of the motor shaft, and thus the inertia (moment of inertia) around the rotation axis of an input of the actuator with a built-in speed reducer increases. Therefore, it is difficult to increase the rotational speed and rotational acceleration of the actuator with a built-in speed reducer.

Accordingly, the present disclosure provides a vertical articulated robot capable of increasing the rotational speed and rotational acceleration of a joint axis portion unit.

A vertical articulated robot according to a first aspect of the present disclosure includes a plurality of arms, a plurality of joint axis portion units configured to rotationally drive the plurality of arms, and a wiring unit configured to allow wiring portions of the plurality of joint axis portion units to be arranged therein. At least a joint axis portion unit other than a distal joint axis portion unit to which a tool is attached of the plurality of joint axis portion units integrally includes a first motor including a solid first motor shaft, and a first speed reducer directly connected to the first motor shaft.

As described above, the vertical articulated robot according to the first aspect of the present disclosure includes the wiring unit configured to allow the wiring portions of the plurality of joint axis portion units to be arranged therein, and at least the joint axis portion unit other than the distal joint axis portion unit to which the tool is attached of the plurality of joint axis portion units integrally includes the first motor including the solid first motor shaft, and the first speed reducer directly connected to the first motor shaft. Accordingly, the inertia (moment of inertia) around the rotation axis of an input of the joint axis portion unit can be decreased as compared with a case in which the wiring is inserted through a hollow portion of the motor shaft, and thus it is possible to provide the vertical articulated robot capable of increasing the rotational speed and rotational acceleration of the joint axis portion unit by a decrease in the inertia around the rotation axis of the input of the joint axis portion unit.

As described above, the vertical articulated robot includes the plurality of joint axis portion units configured to rotationally drive the plurality of arms, and the wiring unit configured to allow the wiring portions of the plurality of joint axis portion units to be arranged therein. Accordingly, the vertical articulated robot can be assembled and maintained (the units can be replaced, for example) unit by unit, and thus the vertical articulated robot can be easily assembled and maintained.

In the aforementioned vertical articulated robot according to the first aspect, the distal joint axis portion unit is preferably a unit integrally including a distal joint axis portion to which the tool is attached and a near distal joint axis portion connected to a side opposite to a distal side of the distal joint axis portion. Accordingly, two of the distal joint axis portion and the near distal joint axis portion can be handled integrally, and thus the distal joint axis portion and the near distal joint axis portion can be easily assembled and maintained as compared with a case in which the distal joint axis portion and the near distal joint axis portion cannot be handled integrally. Consequently, the vertical articulated robot can be more easily assembled and maintained.

In this case, the distal joint axis portion preferably includes a second motor including a second motor shaft, and a second speed reducer connected to the second motor shaft via a belt mechanism, the near distal joint axis portion preferably includes a third motor including a solid third motor shaft, and a third speed reducer directly connected to the third motor shaft, and the distal joint axis portion unit preferably integrally includes the second motor, the belt mechanism, the second speed reducer, the third motor, and the third speed reducer. Accordingly, the second motor, the belt mechanism, and the second speed reducer of the distal joint axis portion, and the third motor and the third speed reducer of the near distal joint axis portion can be handled integrally, and thus the second motor, the belt mechanism, and the second speed reducer of the distal joint axis portion, and the third motor and the third speed reducer of the near distal joint axis portion can be easily assembled and maintained. Furthermore, even when the belt mechanism that requires adjustment of the belt tension is provided, the distal joint axis portion unit being used for the distal joint axis portion unit including the belt mechanism with the belt tension being adjusted can be replaced, and thus it is not necessary to adjust the belt tension of the belt mechanism at the time of replacement. Consequently, as compared with a case in which the belt tension of the belt mechanism is adjusted at the time of replacement, the distal joint axis portion unit including the belt mechanism can be easily replaced.

In the aforementioned vertical articulated robot according to the first aspect, the wiring unit is preferably configured to also serve as at least one of the plurality of arms. Accordingly, the wiring unit can also serve as the arm, and thus as compared with a case in which the wiring unit is provided separately from the arm, the structure for the wiring unit can be simplified.

In this case, the wiring unit preferably integrally includes a wiring arrangement portion and an exterior portion configured to hold the wiring arrangement portion, the exterior portion being configured to also serve as the arm. Accordingly, while the wiring portion is reliably arranged in the wiring arrangement portion, the complexity of the structure and an increase in the number of components can be significantly reduced or prevented by the exterior portion that also serves as the arm.

In the aforementioned configuration in which the wiring unit also serves as the arm, the arm preferably includes a pair of arm bodies including a first arm body configured to receive a driving force from the first motor, and a second arm body arranged so as to face the first arm body, the second arm body being configured to receive no driving force from the first motor, and the wiring unit is preferably configured to also serve as the second arm body of the pair of arm bodies. Accordingly, the wiring unit can also serve as the second arm body that does not directly receive a driving force from the first motor, and thus even when the wiring unit also serves as the arm, the complexity of the structure of the wiring unit that also serves as the arm can be effectively significantly reduced or prevented as compared with a case in which the wiring unit also serves as the first arm body that receives a driving force from the first motor.

In the aforementioned vertical articulated robot according to the first aspect, at least one of the plurality of joint axis portion units preferably integrally includes the first motor, which is a motor including no brake, the first speed reducer, and a brake arranged on the first motor side relative to the first speed reducer, the brake being configured to hold the first motor. Accordingly, the brake can be arranged on the first motor side, and thus the brake can be arranged as close to the first motor as possible. Consequently, the first motor can be stably held by the brake.

In the aforementioned vertical articulated robot according to the first aspect, at least one of the plurality of joint axis portion units preferably integrally includes the first motor, which is a motor including no brake, the first speed reducer, and a brake arranged on a side opposite to the first motor side relative to the first speed reducer, the brake being configured to hold the first motor. Accordingly, the brake can be arranged on the side opposite to the first motor side, and thus the brake can be arranged as close to a surface of the arm as possible. Consequently, the brake can be arranged at a position at which maintenance work for the brake such as replacement of the brake can be easily performed.

A vertical articulated robot according to a second aspect includes a plurality of arms, a plurality of joint axis portion units configured to rotationally drive the plurality of arms, and a wiring unit configured to allow wiring portions of the plurality of joint axis portion units to be arranged therein. At least a joint axis portion unit other than a distal joint axis portion unit to which a tool is attached of the plurality of joint axis portion units integrally includes a first motor including a solid first motor shaft, and a first speed reducer directly connected to the first motor shaft, and at least one of the plurality of joint axis portion units integrally includes the first motor, which is a motor including no brake, and a brake provided separately from the first motor, the brake being configured to hold the first motor.

According to the present disclosure, as described above, it is possible to provide the vertical articulated robot capable of increasing the rotational speed and rotational acceleration of the joint axis portion unit.

BRIEF DESCRIPTION OF THE DRAWINGS

FIG. 21 is a sectional view showing the third joint axis portion unit of the vertical articulated robot according to the second embodiment; and FIG. 22 is a sectional view showing a second arm, a second joint axis portion unit, a third joint axis portion unit, and a second joint axis portion wiring unit of the vertical articulated robot according to the second embodiment.

DETAILED DESCRIPTION

Embodiments embodying the present disclosure are hereinafter described on the basis of the drawings.

First Embodiment

Configuration of Vertical Articulated Robot

The configuration of a vertical articulated robot 100 according to a first embodiment of the present disclosure is now described with reference to FIGS. 1 to 16.

Figure 1:
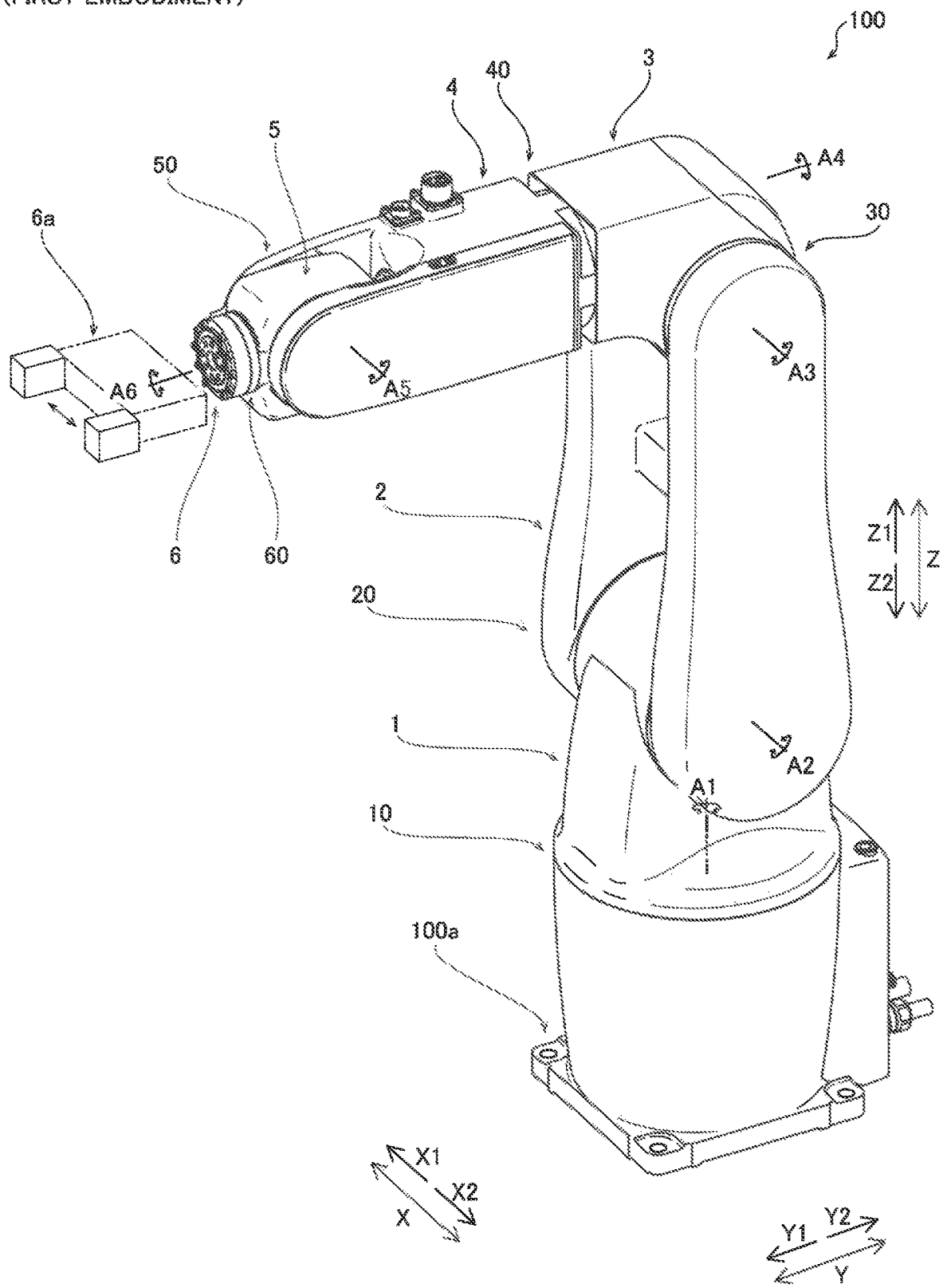
FIG. 1 is a perspective view showing the overall configuration of a vertical articulated robot according to a first embodiment.

As shown in FIG. 1, the vertical articulated robot 100 is a six-axis robot having six degrees of freedom. The vertical articulated robot 100 is installed on an installation surface such as a floor via a base 100a.

The vertical articulated robot 100 includes a plurality of (six) arms 1 to 6 and a plurality of (six) joint axis portions 10 to 60 to rotationally drive the plurality of arms 1 to 6. The plurality of arms 1 to 6 include a first arm 1, a second arm 2, a third arm 3, a fourth arm 4, a fifth arm 5, and a sixth arm 6. The plurality of joint axis portions 10 to 60 include a first joint axis portion 10, a second joint axis portion 20, a third joint axis portion 30, a fourth joint axis portion 40, a fifth joint axis portion 50, and a sixth joint axis portion 60. The fifth joint axis portion 50 and the sixth joint axis portion 60 are examples of a "near distal joint axis portion" and a "distal joint axis portion" in the claims, respectively.

The first joint axis portion 10 rotationally drives the first arm 1 around a rotation axis A1 extending along a vertical direction (Z direction). The first arm 1 connects the first joint axis portion 10 to the second joint axis portion 20. The second joint axis portion 20 rotationally drives the second arm 2 around a rotation axis A2 extending along a width direction (X direction, horizontal direction) orthogonal to a direction in which the second arm 2 extends. The second arm 2 connects the second joint axis portion 20 to the third joint axis portion 30. The third joint axis portion 30 rotationally drives the third arm 3 around a rotation axis A3 extending along the width direction (X direction, horizontal direction) orthogonal to a direction in which the third arm 3 extends. The third arm 3 connects the third joint axis portion 30 to the fourth joint axis portion 40.

The fourth joint axis portion 40 rotationally drives the fourth arm 4 around a rotation axis A4 extending along a direction (Y direction) in which the fourth arm 4 extends. The fourth arm 4 connects the fourth joint axis portion 40 to the fifth joint axis portion 50. The fifth joint axis portion 50 rotationally drives the fifth arm 5 around a rotation axis A5 extending along the horizontal direction (X direction). The fifth arm 5 connects the fifth joint axis portion 50 to the sixth joint axis portion 60. The sixth joint axis portion 60 rotationally drives the sixth arm 6 around a rotation axis A6 extending along a direction (Y direction) orthogonal to the rotation axis A5. The sixth arm 6 is a tool flange, and a tool 6a (end effector) is attached to the sixth arm 6. The fifth joint axis portion 50, the fifth arm 5, the sixth joint axis portion 60, and the sixth arm 6 correspond to a wrist structure.

Figure 2:
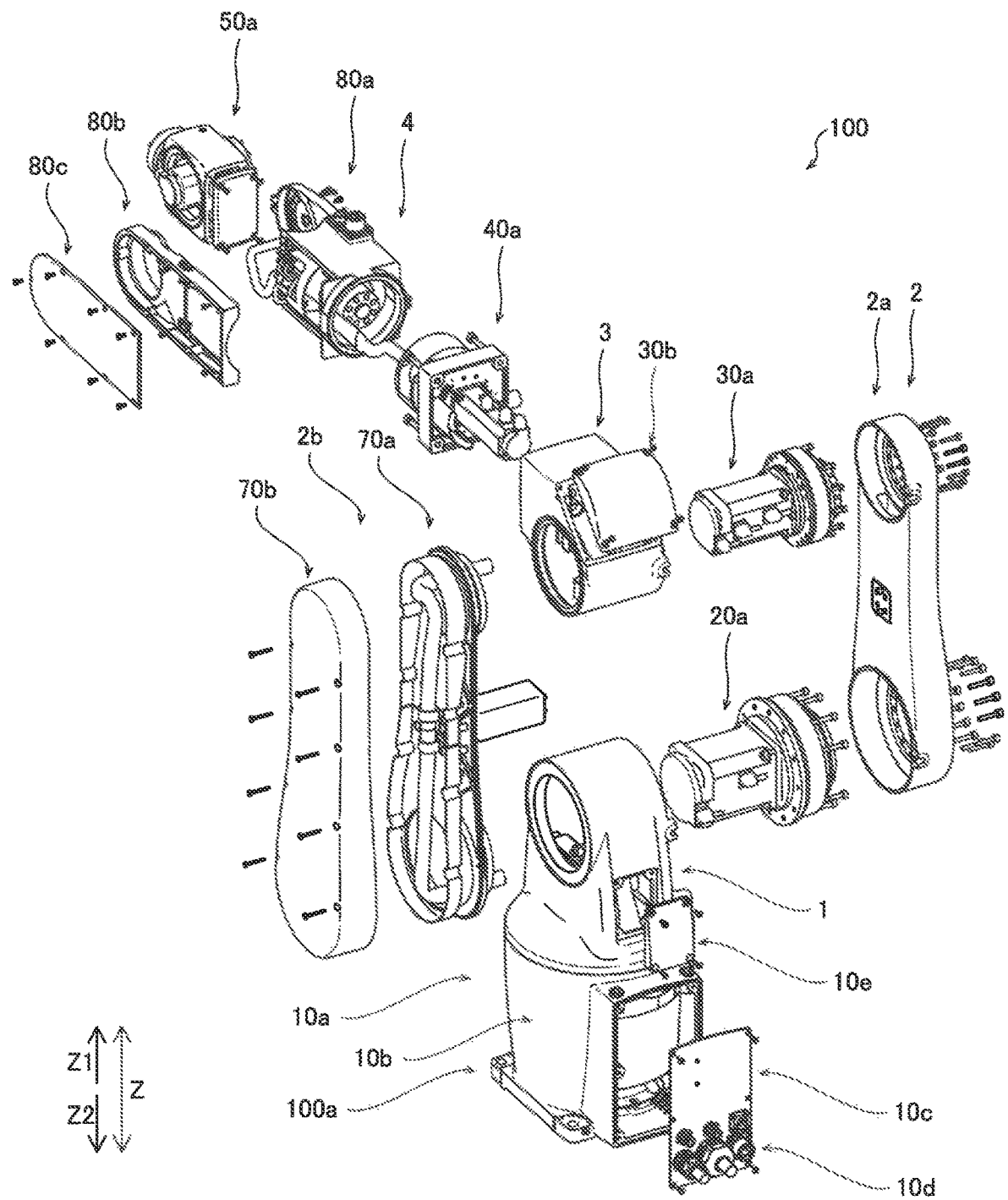
FIG. 2 is an exploded perspective view showing the overall configuration of the vertical articulated robot according to the first embodiment.

In the first embodiment, as shown in FIG. 2, the vertical articulated robot 100 is unitized in order to facilitate assembly and maintenance. Specifically, the vertical articulated robot 100 includes a first joint axis portion unit 10a, a second joint axis portion unit 20a, a third joint axis portion unit 30a, a fourth joint axis portion unit 40a, and a fifth and sixth joint axis portion unit 50a. Furthermore, the vertical articulated robot 100 includes a second joint axis portion wiring unit 70a and a fourth joint axis portion wiring unit 80a. Moreover, the vertical articulated robot 100 includes a cover 70b attached to the second joint axis portion wiring unit 70a, and a sub-arm 80b and a cover 80c both attached to the fourth joint axis portion wiring unit 80a and the fifth and sixth joint axis portion unit 50a. The vertical articulated robot 100 can be replaced unit by unit.

The first joint axis portion unit 10a, the second joint axis portion unit 20a, the third joint axis portion unit 30a, the fourth joint axis portion unit 40a, and the fifth and sixth joint axis portion unit 50a are examples of a "joint axis portion unit" in the claims. The fifth and sixth joint axis portion unit 50a is an example of a "distal joint axis portion unit" in the claims. The second joint axis portion wiring unit 70a and the fourth joint axis portion wiring unit 80a are examples of a "wiring unit" in the claims.

Configuration of First Joint Axis Portion Unit

Figure 3:
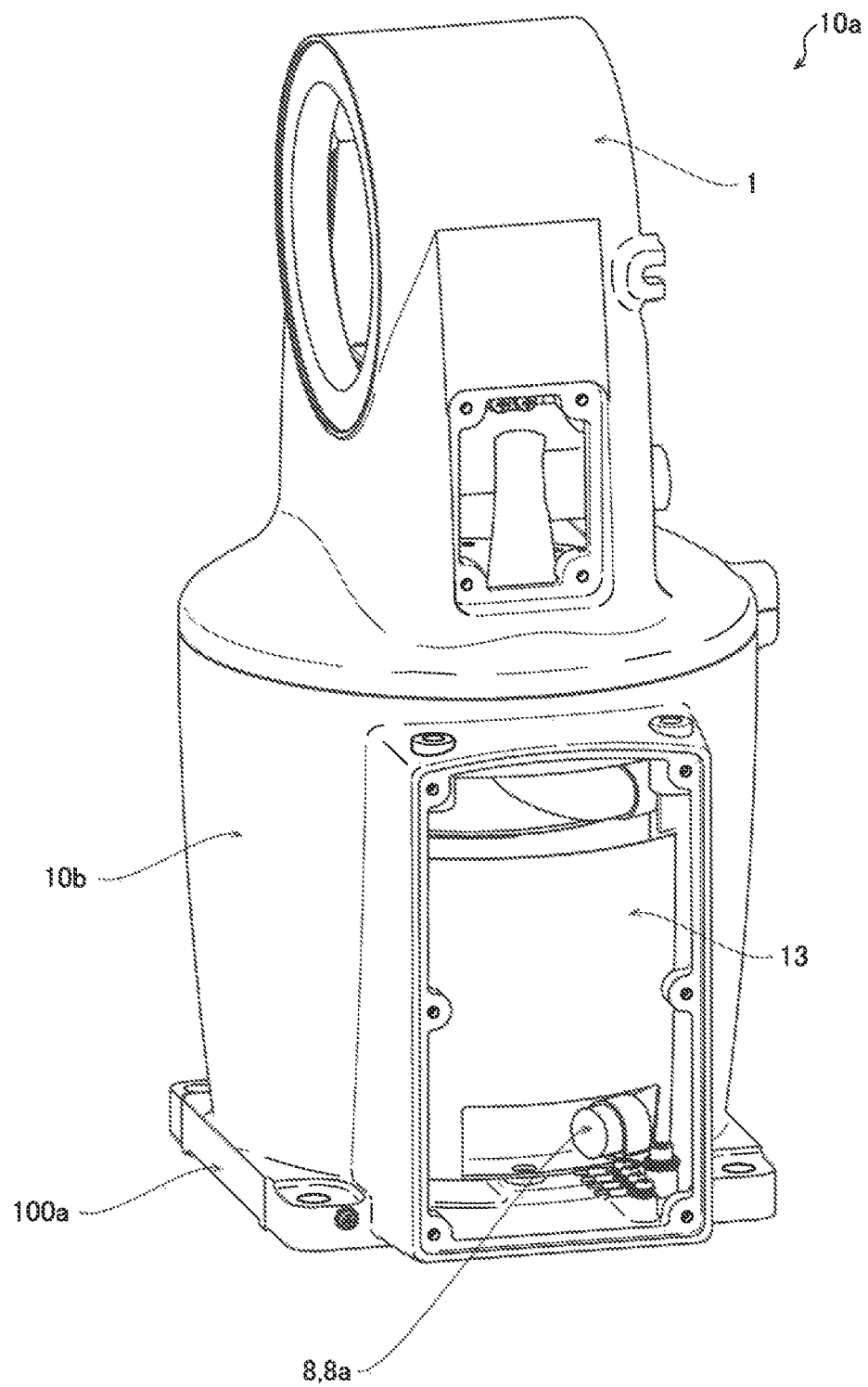
FIG. 3 is a perspective view showing a first joint axis portion unit of the vertical articulated robot according to the first embodiment.
Figure 4:
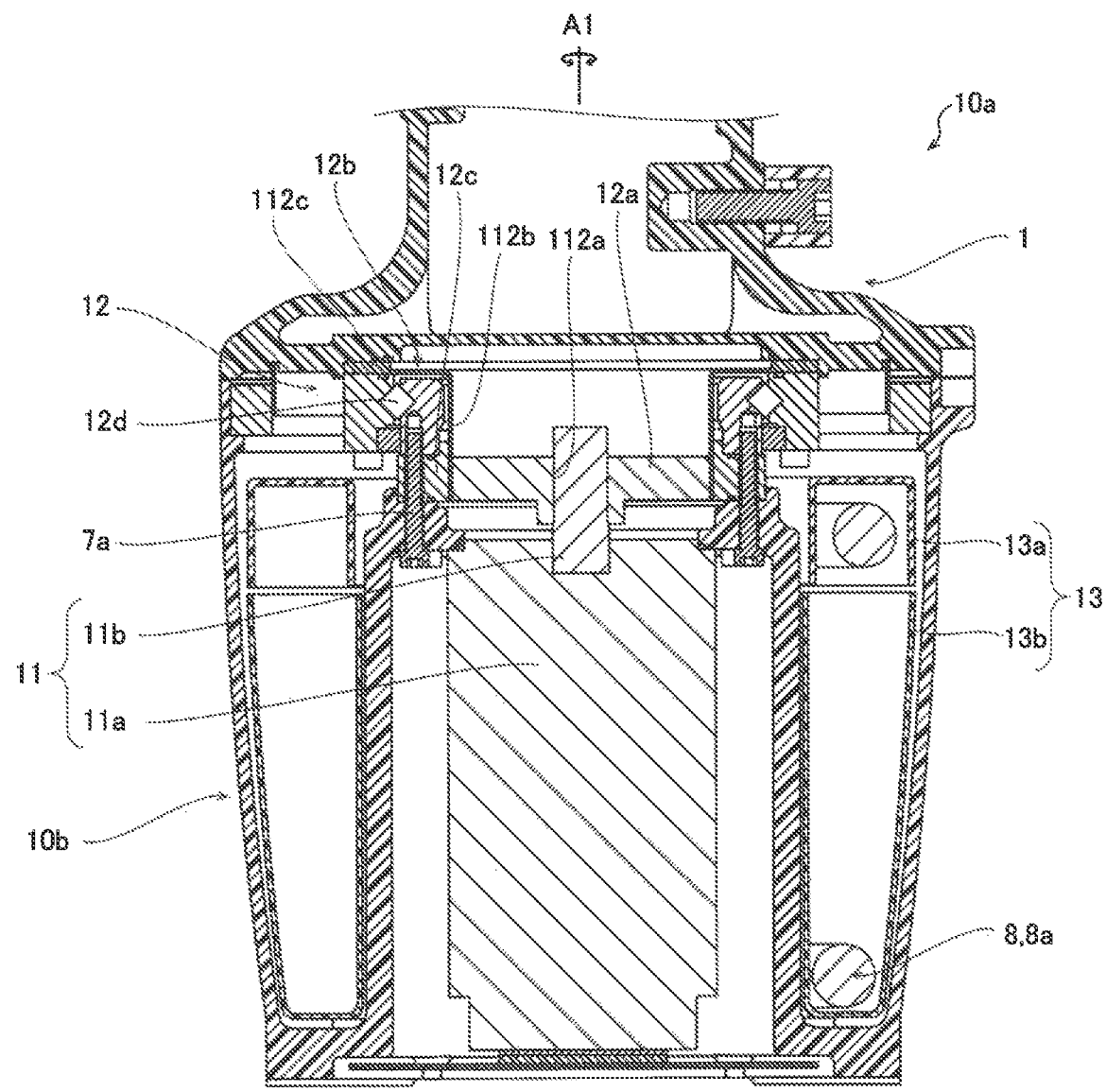
FIG. 4 is a sectional view showing the first joint axis portion unit of the vertical articulated robot according to the first embodiment.

As shown in FIGS. 2 to 4, the first joint axis portion 10 forms the first joint axis portion unit 10a integrally including the first joint axis portion 10, the first arm 1, and a base body 10b. The first joint axis portion unit 10a is attachable and detachable while integrally including the first joint axis portion 10, the first arm 1, and the base body 10b.

The first joint axis portion 10 includes a motor 11 and a speed reducer 12. The motor 11 and the speed reducer 12 are examples of a "first motor" and a "first speed reducer" in the claims, respectively.

The motor 11 generates a driving force to rotationally drive the first arm 1. The motor 11 is attached to the base body 10b by a fixing tool such as a screw (not shown). The motor 11 includes a housing 11a and a solid motor shaft 11b. The housing 11a houses a stator, a rotor, a brake, etc. That is, the motor 11 is a motor with a brake, which includes the brake in the housing 11a. The motor shaft 11b is an output shaft of the motor 11, and extends along a direction (Z direction) in which the rotation axis A1 extends. The motor shaft 11b is directly connected to the speed reducer 12. The motor shaft 11b is an example of a "first motor shaft" in the claims.

The speed reducer 12 is arranged coaxially with the motor 11 and is directly connected to the motor shaft 11b of the motor 11. The speed reducer 12 is a wave gear speed reducer including a wave generator 12a, a flexspline 12b, and a circular spline 12c. The wave generator 12a is an input of the speed reducer 12, and is connected to the motor shaft 11b by a key and a set screw while the motor shaft 11b is inserted into a through-hole 112a for connection. The flexspline 12b is an output of the speed reducer 12 and is connected to the first arm 1. The circular spline 12c is a fixed portion of the speed reducer 12 and is attached to the base body 10b. Furthermore, the speed reducer 12 includes a bearing 12d. The bearing 12d rotatably holds the flexspline 12b with respect to the circular spline 12c. The bearing 12d is a cross-roller bearing.

The wave generator 12a has an elliptical disk shape including the through-hole 112a for inserting the motor shaft 11b at the center of rotation. The wave generator 12a is press-fitted into a cylindrical portion 112b of the flexspline 12b described below. The flexspline 12b includes the cylindrical portion 112b and a flange 112c. The cylindrical portion 112b has a hollow shape and extends along the direction (Z direction) in which the rotation axis A1 extends. The cylindrical portion 112b includes external teeth that mesh with internal teeth of the circular spline 12c. The flange 112c has an annular shape and extends outward (to a side away from the center of rotation) from an end of the cylindrical portion 112b on the side (Z1 direction side) opposite to the motor 11 side. The circular spline 12c has an annular shape and includes the internal teeth that mesh with the external teeth of the flexspline 12b.

The flexspline 12b, which is the output of the speed reducer 12, is attached to the first arm 1 by a fixing tool such as a screw (not shown) at the flange 112c. Furthermore, the circular spline 12c, which is the fixed portion of the speed reducer 12, is attached to the base body 10b by a fixing tool 7a such as a screw.

The first joint axis portion unit 10a integrally includes the motor 11 including the solid motor shaft 11b, and the speed reducer 12 directly connected to the motor 11. Specifically, the first joint axis portion unit 10a integrally includes the motor 11, the speed reducer 12, the first arm 1, and the base body 10b.

The base body 10b houses the motor 11 of the first joint axis portion 10 and the speed reducer 12. Furthermore, the base body 10b includes a base 100a at its end on the Z2 direction side. Moreover, the base body 10b includes a wiring arrangement portion 13 therein. The wiring arrangement portion 13 surrounds the motor 11 of the first joint axis portion 10. The wiring arrangement portion 13 partitions a first portion 8a of a wiring portion 8 from the base body 10b and holds the first portion 8a. The first portion 8a of the wiring portion 8 is connected to a second portion 8b (see FIG. 6, for example) of the wiring portion 8 described below.

The wiring portion 8 includes wiring such as a signal line, a power line, and a communication line, and air piping for supplying air to drive the tool 6a such as a hand, for example. Furthermore, the wiring portion 8 includes a wiring housing tube to house the wiring such as a signal line, a power line, and a communication line, and the air piping. The wiring portion 8 is arranged with the wiring and the air piping being housed in the wiring housing tube.

The wiring arrangement portion 13 is made of a low-friction resin material in order to significantly reducing or preventing rubbing of the first portion 8a of the wiring portion 8. In the wiring arrangement portion 13, the first portion 8a of the wiring portion 8 is arranged so as to have a folded portion. Specifically, in the wiring arrangement portion 13, the first portion 8a of the wiring portion 8 is arranged in a U shape as viewed in the Y direction. The wiring arrangement portion 13 includes a movable portion 13a and a fixed portion 13b. The movable portion 13a is arranged on the first arm 1 side (Z1 direction side) relative to the fixed portion 13b, and can move according to rotation of the first arm 1 around the rotation axis A1. The fixed portion 13b is arranged on the side (Z2 direction side) opposite to the first arm 1 side relative to the movable portion 13a, and is fixed to the base body 10b so as not to move.

As shown in FIG. 2, a cover 10c with a wiring connector is detachably provided on the base body 10b. The cover 10c with a wiring connector includes a plurality of connectors 10d for the wiring portion 8 such as a signal line, a power line, a communication line, and air piping. Furthermore, a wiring maintenance cover 10e is detachably provided on the first arm 1. The wiring maintenance cover 10e exposes the first portion 8a and the second portion 8b of the wiring portion 8, a motor 21 described below, etc. to the outside when the wiring maintenance cover 10e is removed from the first arm 1. Thus, wiring work such as wiring connection work between the first portion 8a and the second portion 8b of the wiring portion 8 and wiring connection work between the wiring portion 8 and the motor 21 can be easily performed.

Configuration of Second Joint Axis Portion Unit

Figure 5:
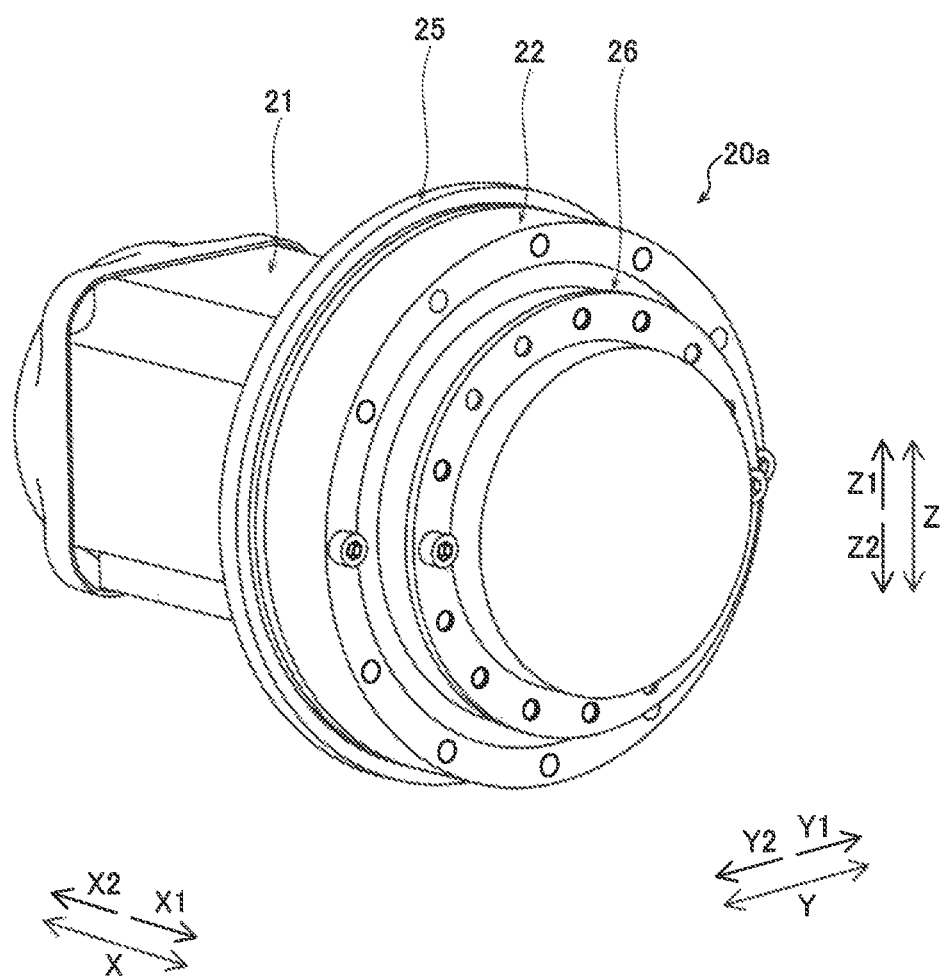
FIG. 5 is a perspective view showing a second joint axis portion unit of the vertical articulated robot according to the first embodiment.
Figure 6:
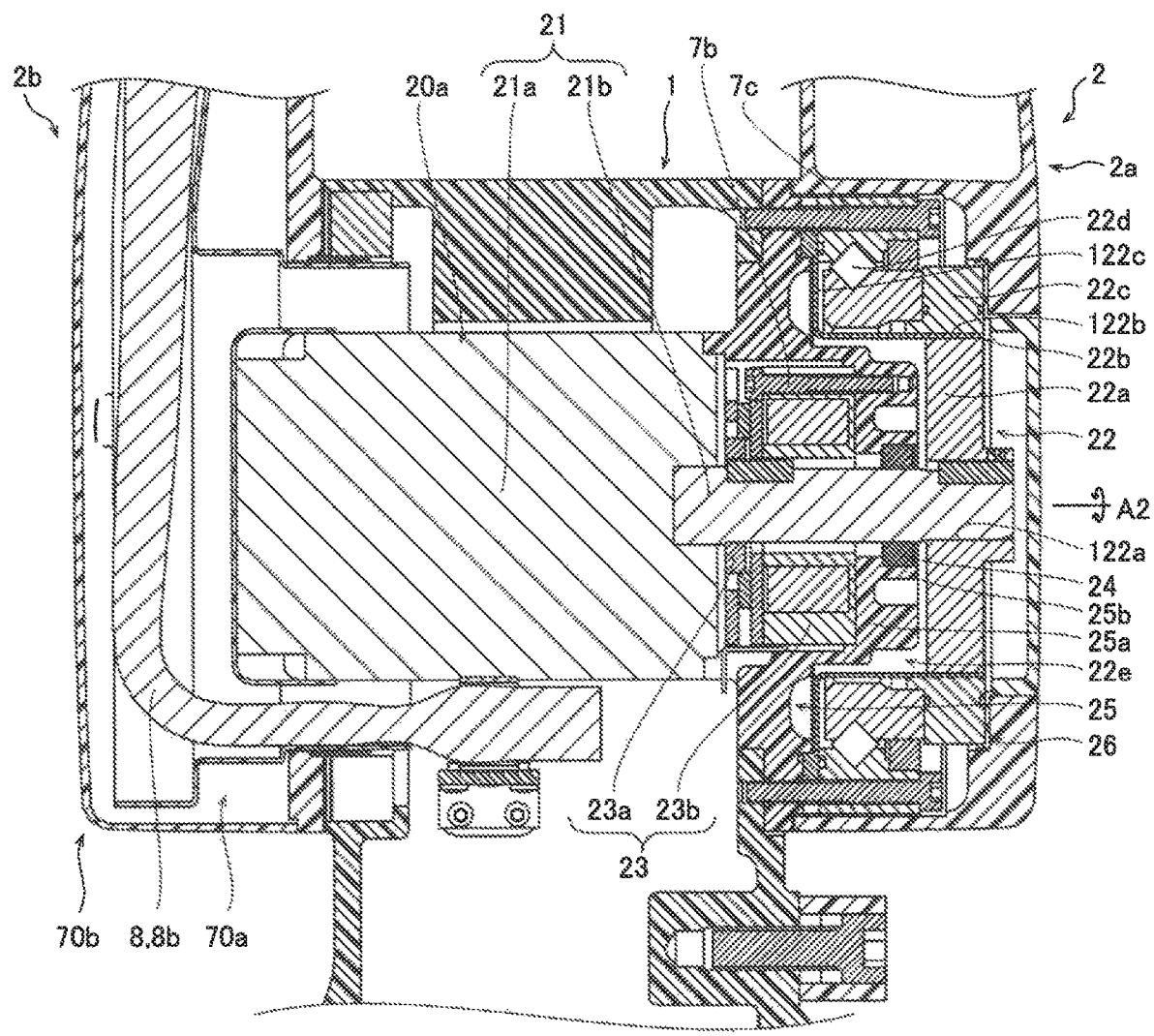
FIG. 6 is a sectional view showing the second joint axis portion unit of the vertical articulated robot according to the first embodiment.

As shown in FIGS. 2, 5, and 6, the second joint axis portion unit 20a is a motor unit integrally including the motor 21, a speed reducer 22, a brake 23, an oil seal 24, and a holding member 25 of the second joint axis portion 20. The second joint axis portion unit 20a is attachable and detachable while integrally including the motor 21, the speed reducer 22, the brake 23, the oil seal 24, and the holding member 25. The motor 21 and the speed reducer 22 are examples of a "first motor" and a "first speed reducer" in the claims, respectively.

The motor 21 generates a driving force to rotationally drive the second arm 2. The motor 21 includes a housing 21a and a solid motor shaft 21b. The housing 21a houses a stator, a rotor, etc. On the other hand, the housing 21a does not house the brake and the oil seal. That is, the motor 21 is a motor without a brake and an oil seal, which does not include the brake and the oil seal in the housing 21a. Therefore, the housing 21a of the motor 21 has a smaller length in an axial direction (X direction) than a housing of a motor with a brake and an oil seal, which includes the brake and the oil seal in the housing. The motor shaft 21b is an output shaft of the motor 21, and extends along a direction (X direction) in which the rotation axis A2 extends. The motor shaft 21b is directly connected to the speed reducer 22. The motor shaft 21b is an example of a "first motor shaft" in the claims.

The speed reducer 22 is arranged coaxially with the motor 21 and is directly connected to the motor shaft 21b of the motor 21. The speed reducer 22 is a wave gear speed reducer including a wave generator 22a, a flexspline 22b, and a circular spline 22c. The wave generator 22a is an input of the speed reducer 22, and the motor shaft 21b is inserted into a through-hole 122a for connection such that the wave generator 22a is connected to the motor shaft 21b. The flexspline 22b is a fixed portion of the speed reducer 22 and is attached to the first arm 1 via the holding member 25. The circular spline 22c is an output of the speed reducer 22 and is connected to the second arm 2 via a holding member 26. Furthermore, the speed reducer 22 includes a bearing 22d. The bearing 22d rotatably holds the circular spline 22c with respect to the flexspline 22b. The bearing 22d is a cross-roller bearing.

The wave generator 22a has an elliptical disk shape including the through-hole 122a for inserting the motor shaft 21b at the center of rotation. The wave generator 22a is press-fitted into a cylindrical portion 122b of the flexspline 22b described below. The flexspline 22b includes the cylindrical portion 122b and a flange 122c. The cylindrical portion 122b has a hollow shape and extends along the direction (X direction) in which the rotation axis A2 extends. The cylindrical portion 122b includes external teeth that mesh with internal teeth of the circular spline 22c. The flange 122c has an annular shape and extends outward (to a side away from the center of rotation) from an end of the cylindrical portion 122b on the motor 21 side (X2 direction side). The circular spline 22c has an annular shape and includes the internal teeth that mesh with the external teeth of the flexspline 22b.

The flexspline 22b, which is the fixed portion of the speed reducer 22, is attached to the holding member 25 by a fixing tool such as a screw (not shown) at the flange 122c. The holding member 25 is attached to the first arm 1 by a fixing tool 7c such as a screw. Furthermore, the holding member 26 is provided on the circular spline 22c, which is the output of the speed reducer 22, to prevent grease leakage. The circular spline 22c is attached to the second arm 2 by a fixing tool such as a screw (not shown) via the holding member 26.

The brake 23 holds the motor 21. The brake 23 is a non-excitation actuated electromagnetic brake that holds the motor 21 when it is not energized and releases the holding of the motor 21 when it is energized. A brake hub 23a of the brake 23 is attached to a base of the motor shaft 21b by being press-fitted into the motor shaft 21b. A main body 23b of the brake 23 is attached to a brake holder 25a of the holding member 25 by a fixing tool 7b such as a screw. The oil seal 24 seals the grease of the speed reducer 22. The oil seal 24 is mounted on the motor shaft 21b. The oil seal 24 is held by an oil seal holder 25b of the holding member 25.

The brake 23 and the oil seal 24 are provided outside the housing 21a of the motor 21 separately from the motor 21. The brake 23 and the oil seal 24 are arranged between the housing 21a of the motor 21 and the wave generator 22a of the speed reducer 22 in the direction (X direction) in which the rotation axis A2 extends. The brake 23 and the oil seal 24 are arranged on the motor 21 side (X2 direction side) relative to the wave generator 22a of the speed reducer 22. The brake 23 and the oil seal 24 are arranged in this order from the motor 21 side (X2 direction side) toward the speed reducer 22 side (X1 direction side).

The holding member 25 integrally holds the motor 21, the speed reducer 22, the brake 23, and the oil seal 24. Specifically, the motor 21 is attached to the holding member 25 by a fixing tool such as a screw (not shown). The speed reducer 22 is attached to the holding member 25 by a fixing tool such as a screw (not shown). The brake 23 is attached to the brake holder 25a of the holding member 25 by the fixing tool 7b such as a screw. The oil seal 24 is held by the oil seal holder 25b of the holding member 25. While integrally including the motor 21, the speed reducer 22, the brake 23, the oil seal 24, and the holding member 25, the second joint axis portion unit 20a is attached to the first arm 1 via the holding member 25 by the fixing tool 7c such as a screw and is attached to the second arm 2 via the holding member 26.

The speed reducer 22 includes a recess 22e that is recessed along the direction (X direction) in which the rotation axis A2 extends. The recess 22e is defined by at least the wave generator 22a, the flexspline 22b, the circular spline 22c, and the bearing 22d. Specifically, the bottom of the recess 22e is defined by the wave generator 22a. A side of the recess 22e is defined by the flexspline 22b, the circular spline 22c, and the bearing 22d. The speed reducer 22 includes the recess 22e on the motor 21 side (X2 direction side). That is, the recess 22e is recessed from the motor 21 side (X2 direction side) toward the speed reducer 22 side (X1 direction side).

At least a portion (a portion on the X1 direction side) of the brake 23 and the oil seal 24 are arranged inside the recess 22e. That is, at least the portion of the brake 23 and the oil seal 24 are arranged so as to fit inside the recess 22e. Thus, at least the portion of the brake 23 and the oil seal 24 can be arranged using the recess 22e, and thus as compared with a case in which a motor with a brake is used for the second joint axis portion unit 20a, the second joint axis portion unit 20a can be downsized in the axial direction (X direction). At least the portion of the brake 23 and the oil seal 24 overlap the recess 22e (the cylindrical portion 122b of the flexspline 22b and the bearing 22d) as viewed in a direction (such as the Y direction or Z direction) orthogonal to the direction in which the rotation axis A2 extends.

Similarly, the brake holder 25a of the holding member 25 and the oil seal holder 25b are arranged inside the recess 22e. That is, the brake holder 25a and the oil seal holder 25b are arranged so as to fit inside the recess 22e. The brake holder 25a and the oil seal holder 25b overlap the recess 22e (the cylindrical portion 122b of the flexspline 22b and the bearing 22d) as viewed in the direction (such as the Y direction or Z direction) orthogonal to the direction in which the rotation axis A2 extends.

Configuration of Third Joint Axis Portion Unit

Figure 7:
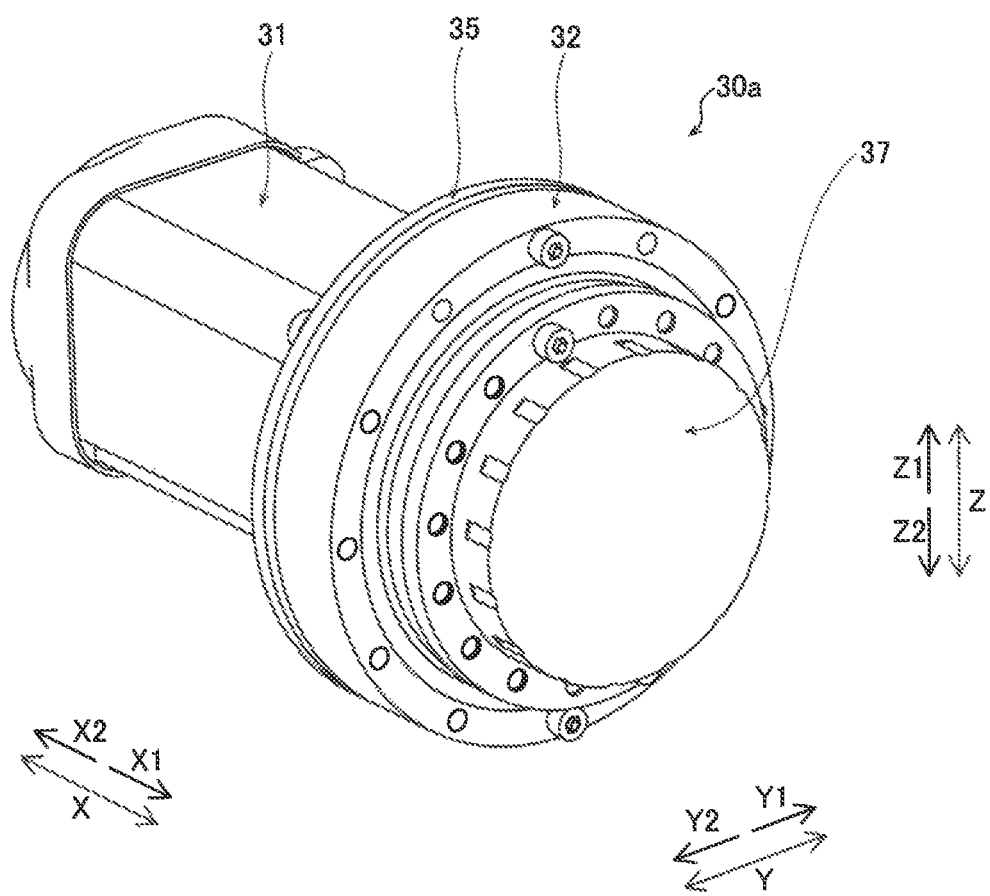
FIG. 7 is a perspective view showing a third joint axis portion unit of the vertical articulated robot according to the first embodiment.
Figure 8:
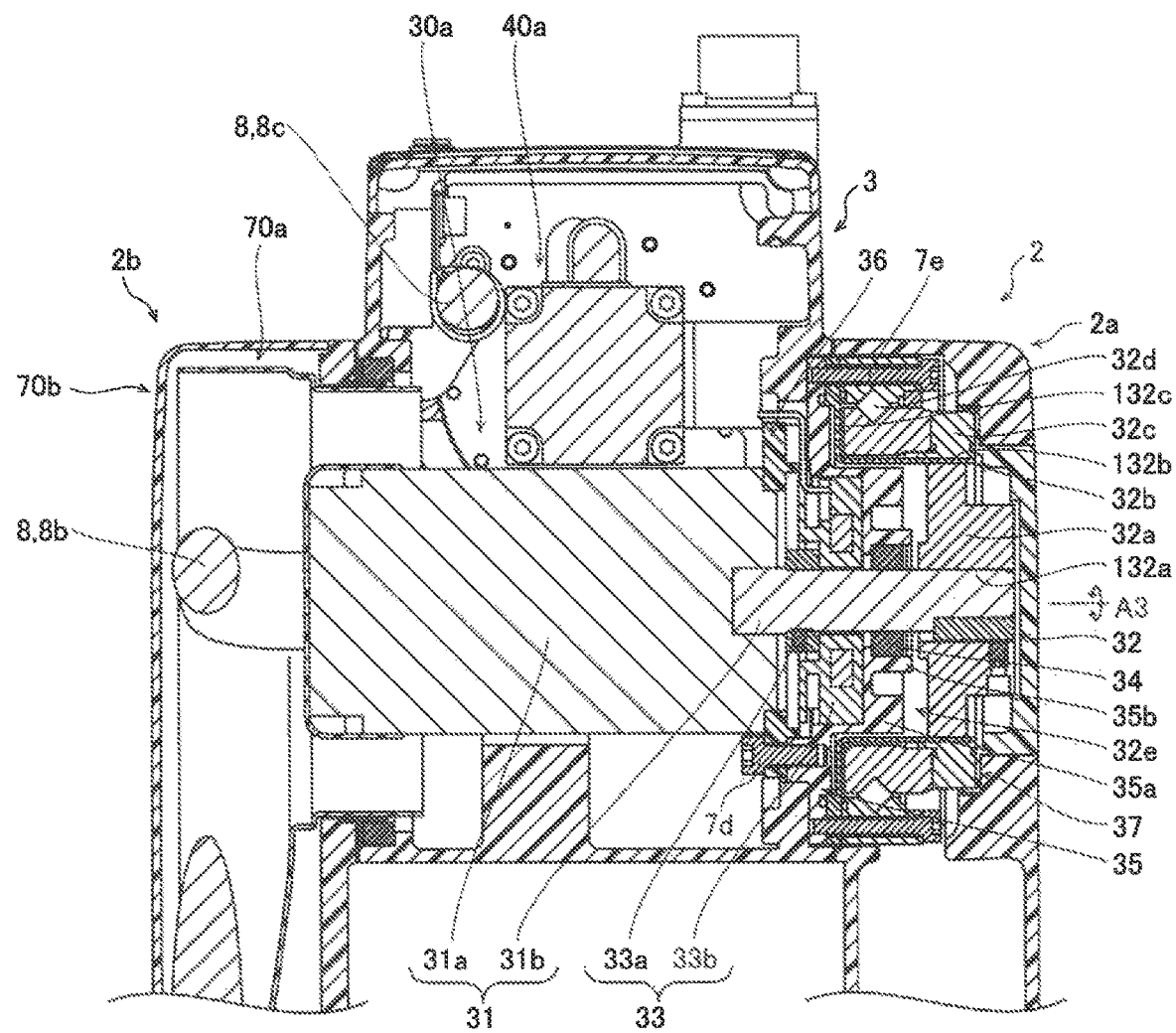
FIG. 8 is a sectional view showing the third joint axis portion unit of the vertical articulated robot according to the first embodiment.

As shown in FIGS. 2, 7, and 8, the third joint axis portion unit 30a is a motor unit integrally including a motor 31, a speed reducer 32, a brake 33, an oil seal 34, and a holding member 35 of the third joint axis portion 30. The third joint axis portion unit 30a is attachable and detachable while integrally including the motor 31, the speed reducer 32, the brake 33, the oil seal 34, and the holding member 35. The motor 31 and the speed reducer 32 are examples of a "first motor" and a "first speed reducer" in the claims, respectively.

The motor 31 generates a driving force to rotationally drive the third arm 3. The motor 31 is attached to a holding member 36 by a fixing tool such as a screw (not shown). Furthermore, the motor 31 is attached to the holding member 35 by a fixing tool 7d such as a screw via the holding member 36. The holding member 35 is attached to the third arm 3. The motor 31 includes a housing 31a and a solid motor shaft 31b. The housing 31a houses a stator, a rotor, etc. On the other hand, the housing 31a does not house the brake and the oil seal. That is, the motor 31 is a motor without a brake and an oil seal, which does not include the brake and the oil seal in the housing 31a. Therefore, the housing 31a of the motor 31 has a smaller length in an axial direction (X direction) than a housing of a motor with a brake and an oil seal, which includes the brake and the oil seal in the housing. The motor shaft 31b is an output shaft of the motor 31, and extends along the direction (X direction) in which the rotation axis A3 extends. The motor shaft 31b is directly connected to the speed reducer 32. The motor shaft 31b is an example of a "first motor shaft" in the claims.

The speed reducer 32 is arranged coaxially with the motor 31 and is directly connected to the motor shaft 31b of the motor 31. The speed reducer 32 is a wave gear speed reducer including a wave generator 32a, a flexspline 32b, and a circular spline 32c. The wave generator 32a is an input of the speed reducer 32, and the motor shaft 31b is inserted into a through-hole 132a for connection such that the wave generator 32a is connected to the motor shaft 31b. The flexspline 32b is an output of the speed reducer 32 and is connected to the third arm 3. The circular spline 32c is a fixed portion of the speed reducer 32 and is attached to the flexspline 32b. Furthermore, the speed reducer 32 includes a bearing 32d. The bearing 32d rotatably holds the flexspline 32b with respect to the circular spline 32c. The bearing 32d is a cross-roller bearing.

The wave generator 32a has an elliptical disk shape including the through-hole 132a for inserting the motor shaft 31b at the center of rotation. The wave generator 32a is press-fitted into a cylindrical portion 132b of the flexspline 32b described below. The flexspline 32b includes the cylindrical portion 132b and a flange 132c. The cylindrical portion 132b has a hollow shape and extends along the direction (X direction) in which the rotation axis A3 extends. The cylindrical portion 132b includes external teeth that mesh with internal teeth of the circular spline 32c. The flange 132c has an annular shape and extends outward (to a side away from the center of rotation) from an end of the cylindrical portion 132b on the motor 21 side (X2 direction side). The circular spline 32c has an annular shape and includes the internal teeth that mesh with the external teeth of the flexspline 32b.

The flexspline 32b, which is the output of the speed reducer 32, is attached to the third arm 3 by a fixing tool such as a screw (not shown) via the holding member 35 at the flange 132c. Furthermore, the circular spline 32c, which is the fixed portion of the speed reducer 32, is attached to the second arm 2 by a fixing tool such as a screw (not shown) via a holding member 37 configured to prevent grease leakage.

The brake 33 holds the motor 31. The brake 33 is a non-excitation actuated electromagnetic brake that holds the motor 31 when it is not energized and releases the holding of the motor 31 when it is energized. A brake hub 33a of the brake 33 is attached to a base of the motor shaft 31b by a set screw. A main body 33b of the brake 33 is attached to a brake holder 35a of the holding member 35 by a fixing tool such as a screw (not shown). The oil seal 34 seals the grease of the speed reducer 32. The oil seal 34 is mounted on the motor shaft 31b. The oil seal 34 is held by an oil seal holder 35b of the holding member 35.

The brake 33 and the oil seal 34 are provided outside the housing 31a of the motor 31 separately from the motor 31. The brake 33 and the oil seal 34 are arranged between the housing 31a of the motor 31 and the wave generator 32a of the speed reducer 32 in the direction (X direction) in which the rotation axis A3 extends. The brake 33 and the oil seal 34 are arranged on the motor 31 side (X2 direction side) relative to the wave generator 32a of the speed reducer 32. The brake 33 and the oil seal 34 are arranged in this order from the motor 31 side (X2 direction side) toward the speed reducer 32 side (X1 direction side).

The holding member 35 integrally holds the motor 31, the speed reducer 32, the brake 33, and the oil seal 34. Specifically, the motor 31 is attached to the holding member 35 by the fixing tool 7d such as a screw via the holding member 36. The speed reducer 32 is attached to the holding member 35 by a fixing tool 7e such as a screw. The brake 33 is attached to the brake holder 35a of the holding member 35 by a fixing tool such as a screw (not shown). The oil seal 34 is held by the oil seal holder 35b of the holding member 35. While integrally including the motor 31, the speed reducer 32, the brake 33, the oil seal 34, and the holding member 35, the third joint axis portion unit 30a is attached to the third arm 3 via the holding member 35 by a fixing tool such as a screw (not shown) and is attached to the second arm 2 via the holding member 37 by a fixing tool such as a screw (not shown).

The speed reducer 32 includes a recess 32e that is recessed along the direction (X direction) in which the rotation axis A3 extends. The recess 32e is defined by at least the wave generator 32a, the flexspline 32b, the circular spline 32c, and the bearing 32d. Specifically, the bottom of the recess 32e is defined by the wave generator 32a. A side of the recess 32e is defined by the flexspline 32b, the circular spline 32c, and the bearing 32d. The speed reducer 32 includes the recess 32e on the motor 31 side (X2 direction side). That is, the recess 32e is recessed from the motor 31 side (X2 direction side) toward the speed reducer 32 side (X1 direction side).

At least a portion (a portion on the X1 direction side) of the brake 33 and the oil seal 34 are arranged inside the recess 32e. That is, at least the portion of the brake 33 and the oil seal 34 are arranged so as to fit inside the recess 32e. Thus, at least the portion of the brake 33 and the oil seal 34 can be arranged using the recess 32e, and thus as compared with a case in which a motor with a brake is used for the third joint axis portion unit 30a, the third joint axis portion unit 30a can be downsized in the axial direction (X direction). At least the portion of the brake 33 and the oil seal 34 overlap the recess 32e (the cylindrical portion 132b of the flexspline 32b and the bearing 32d) as viewed in a direction (such as the Y direction or Z direction) orthogonal to the direction in which the rotation axis A3 extends.

Similarly, the brake holder 35a and the oil seal holder 35b of the holding member 35 are arranged inside the recess 32e. That is, the brake holder 35a and the oil seal holder 35b are arranged so as to fit inside the recess 32e. The brake holder 35a and the oil seal holder 35b overlap the recess 32e (the cylindrical portion 132b of the flexspline 32b and the bearing 32d) as viewed in the direction (such as the Y direction or Z direction) orthogonal to the direction in which the rotation axis A3 extends.

Configuration of Second Joint Axis Portion Wiring Unit

Figure 9:
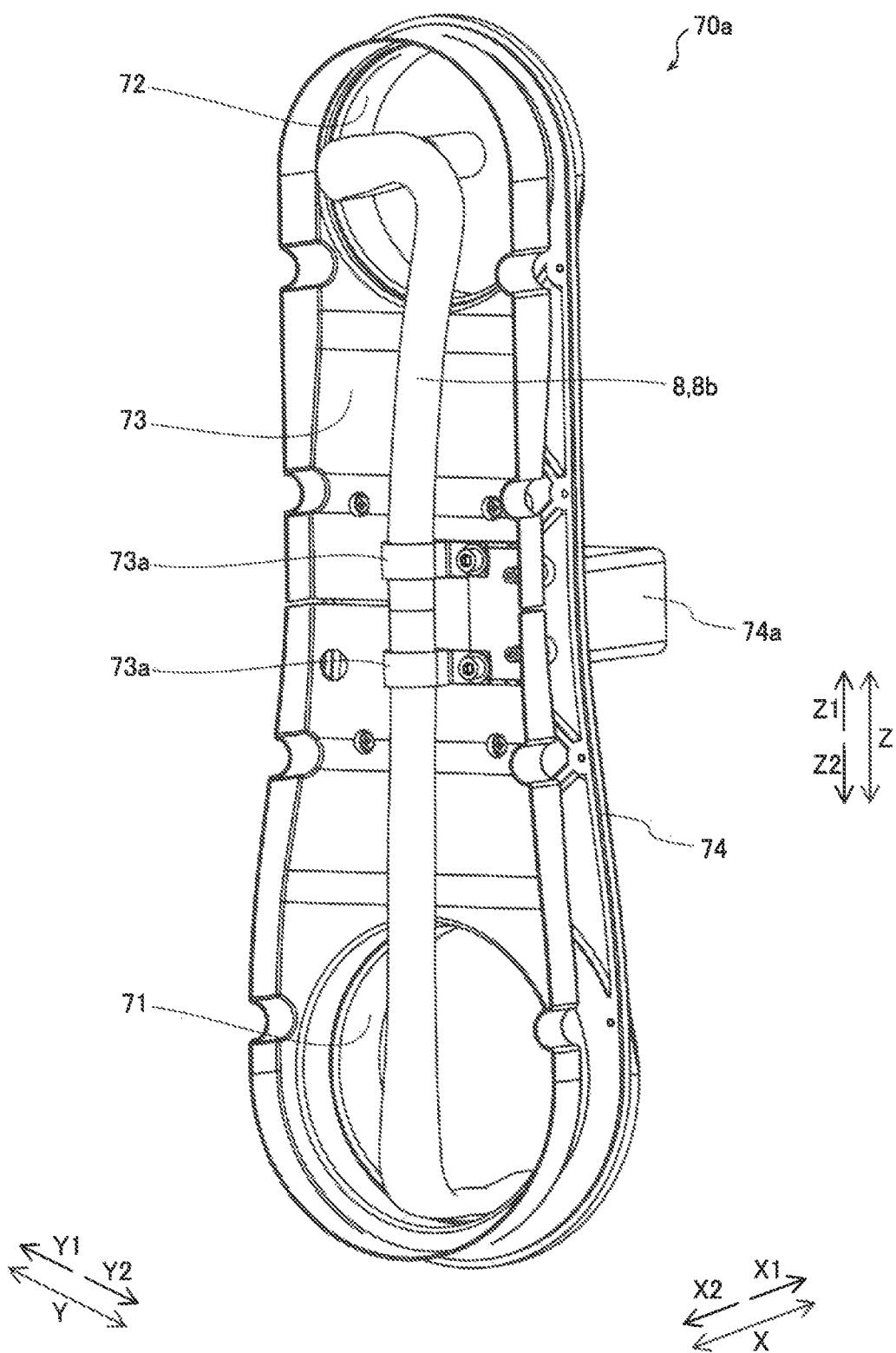
FIG. 9 is a perspective view showing a second joint axis portion wiring unit of the vertical articulated robot according to the first embodiment.
Figure 10:
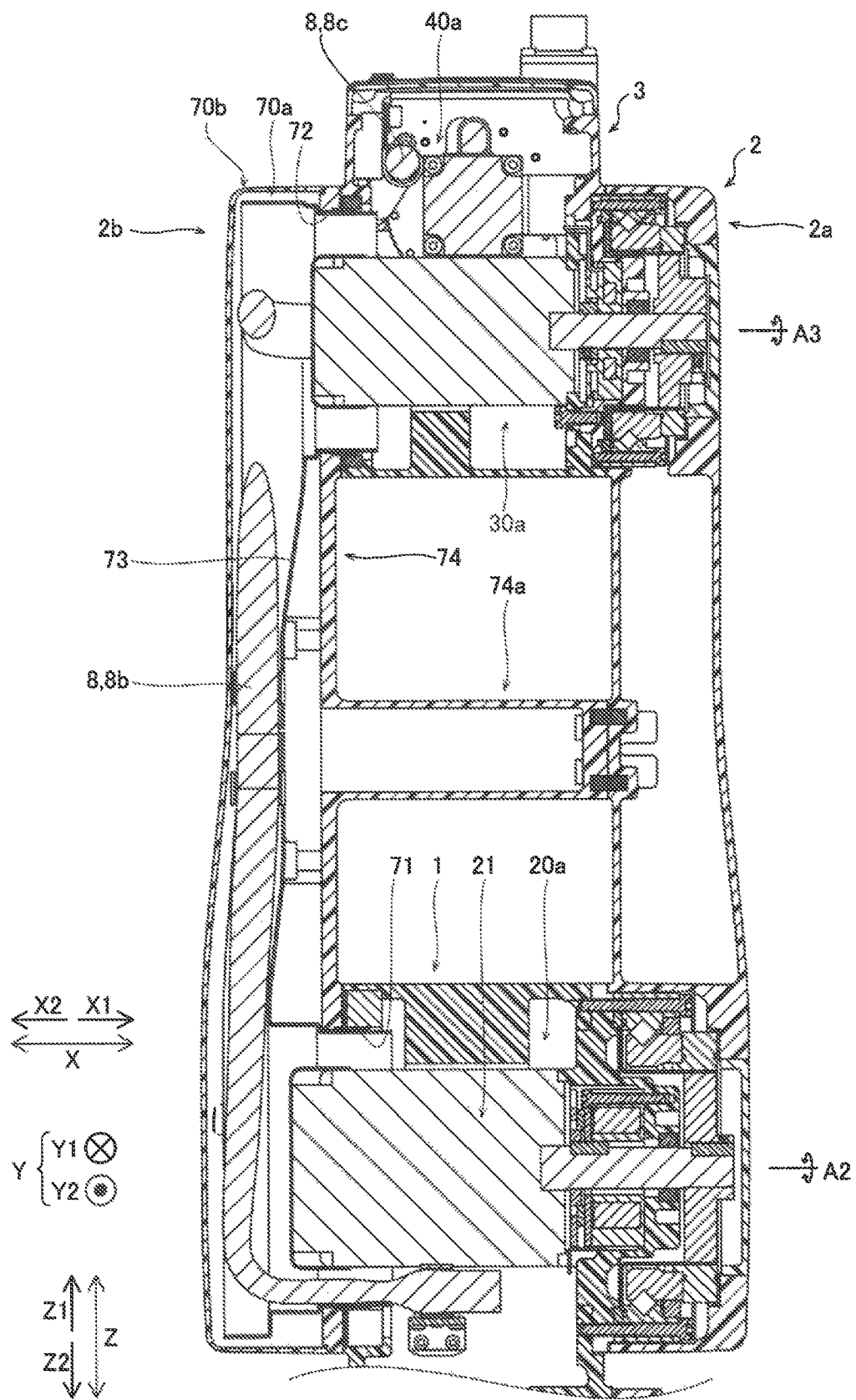
FIG. 10 is a sectional view showing a second arm, a second joint axis portion unit, a third joint axis portion unit, and the second joint axis portion wiring unit of the vertical articulated robot according to the first embodiment.

As shown in FIGS. 2, 9, and 10, the second portion 8b of the wiring portion 8 is arranged in the second joint axis portion wiring unit 70a. A first end of the second portion 8b of the wiring portion 8 is connected to the first portion 8a (see FIG. 4) of the wiring portion 8, and a second end thereof is connected to a third portion 8c (see FIG. 13) of the wiring portion 8 described below. The first end of the second portion 8b of the wiring portion 8 is inserted and arranged in the first arm 1 via an opening 71 of the second joint axis portion wiring unit 70a. Furthermore, the second end of the second portion 8b of the wiring portion 8 is inserted and arranged in the third arm 3 via an opening 72 of the second joint axis portion wiring unit 70a.

The second joint axis portion wiring unit 70a integrally includes a wiring arrangement portion 73 and an exterior portion 74 that holds the wiring arrangement portion 73. The wiring arrangement portion 73 partitions the second portion 8b of the wiring portion 8 from the exterior portion 74 and holds the second portion 8b. The wiring arrangement portion 73 is made of a low-friction resin material in order to significantly reduce or prevent rubbing of the second portion 8b of the wiring portion 8. In the wiring arrangement portion 73, the second portion 8b of the wiring portion 8 extends along the direction (Z direction) in which the second arm 2 extends. Furthermore, clamps 73a are provided in the wiring arrangement portion 73. The clamps 73a fix the second portion 8b of the wiring portion 8 to the wiring arrangement portion 73. The exterior portion 74 forms an exterior portion of the second joint axis portion wiring unit 70a.

In the first embodiment, the second joint axis portion wiring unit 70a also serves as the second arm 2. Specifically, the second arm 2 includes a pair of arm bodies 2a and 2b including a first arm body 2a that receives a driving force from the motor 21 and a second arm body 2b arranged so as to face the first arm body 2a not to receive a driving force from the motor 21. The second joint axis portion wiring unit 70a also serves as the second arm body 2b of the pair of arm bodies 2a and 2b. The exterior portion 74 of the second joint axis portion wiring unit 70a also serves as the second arm body 2b. The exterior portion 74 includes a connection 74a that connects the first arm body 2a to the second arm body 2b. The first arm body 2a and the second arm body 2b are connected to each other via the connection 74a.

A cover 70b is detachably provided on the second joint axis portion wiring unit 70a. The cover 70b exposes the second portion 8b of the wiring portion 8 to the outside when the cover 70b is removed from the second joint axis portion wiring unit 70a. When the cover 70b is attached to the second joint axis portion wiring unit 70a, the cover 70b partitions the second portion 8b of the wiring portion 8 from the outside and covers the second portion 8b.

Configuration of Fourth Joint Axis Portion Unit

Figure 11:
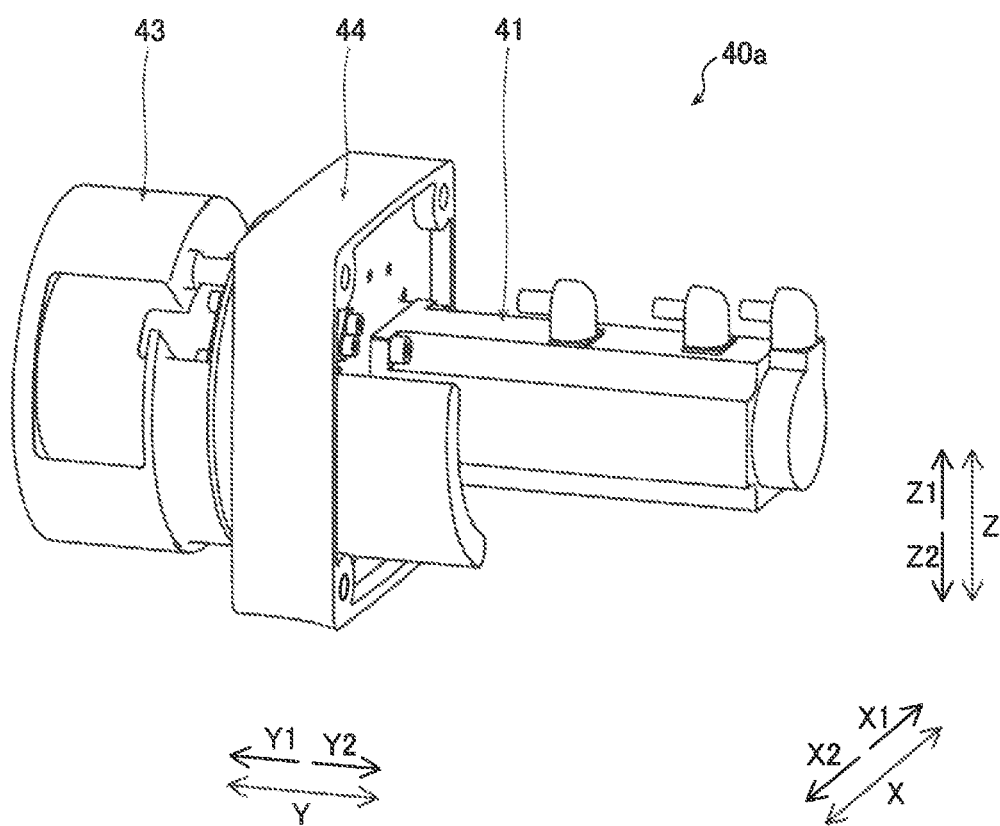
FIG. 11 is a perspective view showing a fourth joint axis portion unit of the vertical articulated robot according to the first embodiment.
Figure 12:
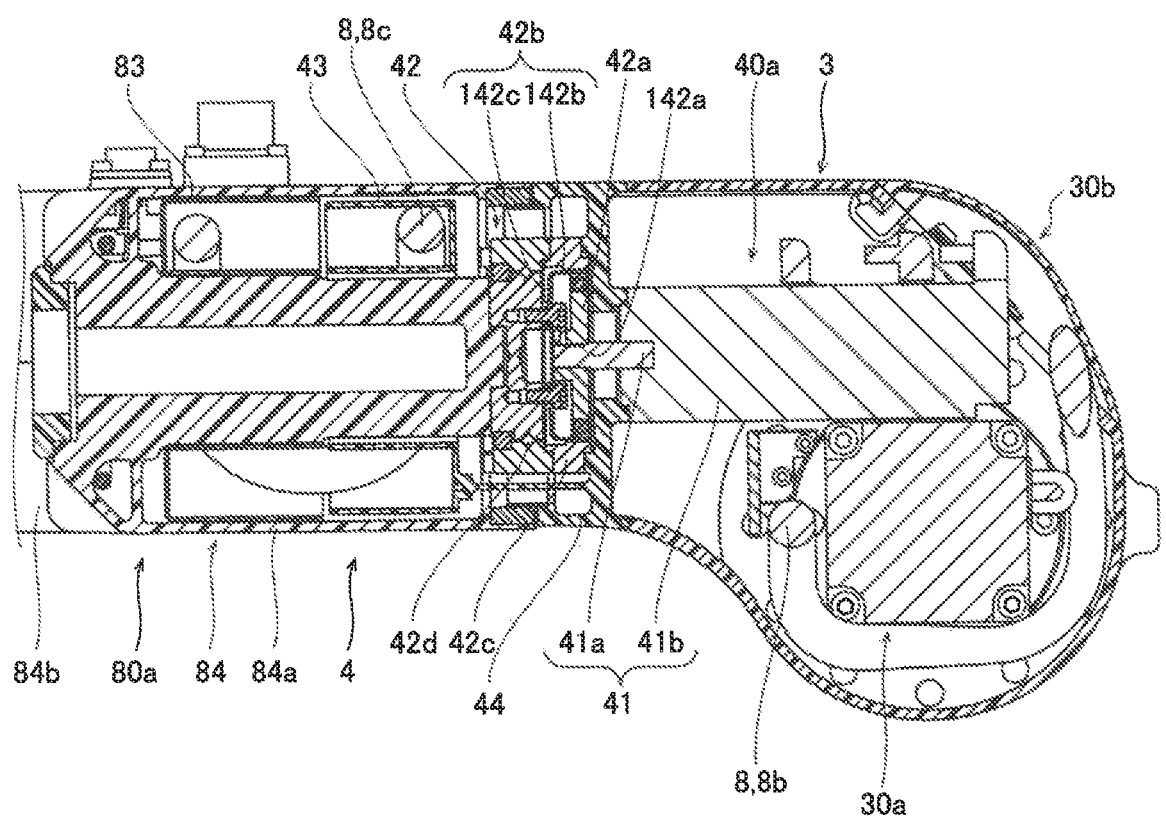
FIG. 12 is a sectional view showing the fourth joint axis portion unit of the vertical articulated robot according to the first embodiment.

As shown in FIGS. 2, 11, and 12, the fourth joint axis portion unit 40a is a motor unit integrally including a motor 41, a speed reducer 42, a wiring arrangement portion 43, and a holding member 44 of the fourth joint axis portion 40. The fourth joint axis portion unit 40a is attachable and detachable while integrally including the motor 41, the speed reducer 42, the wiring arrangement portion 43, and the holding member 44. The motor 41 and the speed reducer 42 are examples of a "first motor" and a "first speed reducer" in the claims, respectively.

The motor 41 generates a driving force to rotationally drive the fourth arm 4. The motor 41 is attached to the holding member 44 by a fixing tool such as a screw (not shown). The motor 41 includes a housing 41a and a solid motor shaft 41b. The housing 41a houses a stator, a rotor, a brake, etc. That is, the motor 41 is a motor with a brake, which includes the brake in the housing 41a. The motor shaft 41b is an output shaft of the motor 41, and extends along a direction (Y direction) in which the rotation axis A4 extends. The motor shaft 41b is directly connected to the speed reducer 42. The motor shaft 41b is an example of a "first motor shaft" in the claims.

The speed reducer 42 is arranged coaxially with the motor 41 and is directly connected to the motor shaft 41b of the motor 41. The speed reducer 42 is a wave gear speed reducer including a wave generator 42a, a flexspline 42b, and a circular spline 42c. The wave generator 42a is an input of the speed reducer 42, and the motor shaft 41b is inserted into a through-hole 142a for connection such that the wave generator 42a is connected to the motor shaft 41b. The flexspline 42b is an output portion of the speed reducer 42, and is connected to the fourth arm 4 via an inner ring of a bearing 42d described below. The circular spline 42c is a fixed portion of the speed reducer 42, and is attached to the holding member 44 by a fixing tool such as a screw (not shown). The speed reducer 42 includes the bearing 42d. The bearing 42d rotatably holds the flexspline 42b with respect to the circular spline 42c. The bearing 42d is a cross-roller bearing.

The wave generator 42a has an elliptical disk shape having the through-hole 442a for inserting the motor shaft 41b at the center of rotation. The wave generator 42a is press-fitted into a cylindrical portion 142b of the flexspline 42b described below. The flexspline 42b has a cup shape and includes the cylindrical portion 142b that is a side of the cup and a bottom 142c of the cup. The cylindrical portion 142b has a hollow shape and extends along a direction (Y direction) in which the rotation axis A4 extends. The cylindrical portion 142b includes external teeth that mesh with internal teeth of the circular spline 42c. The bottom 142c extends inward (to a side closer to the center of rotation) from an end of the cylindrical portion 142b on the side opposite to the motor 41 side (Y1 direction side). The circular spline 42c has an annular shape and includes internal teeth that mesh with external teeth of the flexspline 42b.

The flexspline 42b, which is the output of the speed reducer 42, is attached to the fourth arm 4 via the inner ring of the bearing 42d by a fixing tool such as a screw (not shown) at the bottom 142c. Furthermore, the circular spline 42c, which is a fixed portion of the speed reducer 42, is attached to the holding member 44 by a fixing tool such as a screw (not shown).

The wiring arrangement portion 43 partitions the third portion 8c of the wiring portion 8 from the fourth arm 4 and holds the third portion 8c. The third portion 8c of the wiring portion 8 is connected to the second portion 8b (see FIG. 6, for example) of the wiring portion 8. The wiring arrangement portion 43 is configured as a fixed portion.

The holding member 44 integrally holds the motor 41, the speed reducer 42, and the wiring arrangement portion 43. Specifically, the motor 41 is attached to the holding member 44 by a fixing tool such as a screw (not shown). The speed reducer 42 is attached to the holding member 44 by a fixing tool such as a screw (not shown). The wiring arrangement portion 43 is attached to the holding member 44. The fourth joint axis portion unit 40a is attached to the third arm 3 via the holding member 44 by a fixing tool such as a screw (not shown) while integrally including the motor 41, the speed reducer 42, the wiring arrangement unit 43, and the holding member 44.

As shown in FIG. 2, a wiring maintenance cover 30b is detachably provided on the third arm 3. The wiring maintenance cover 30b exposes the second portion 8b and the third portion 8c of the wiring portion 8, the motor 31, the motor 41, etc. to the outside when the wiring maintenance cover 30b is removed from the third arm 3. Thus, wiring work such as wiring connection work between the second portion 8b and the third portion 8c of the wiring portion 8 and wiring connection work between the wiring portion 8 and both the motor 31 and the motor 41 can be easily performed.

Configuration of Fourth Joint Axis Portion Wiring Unit

Figure 13:
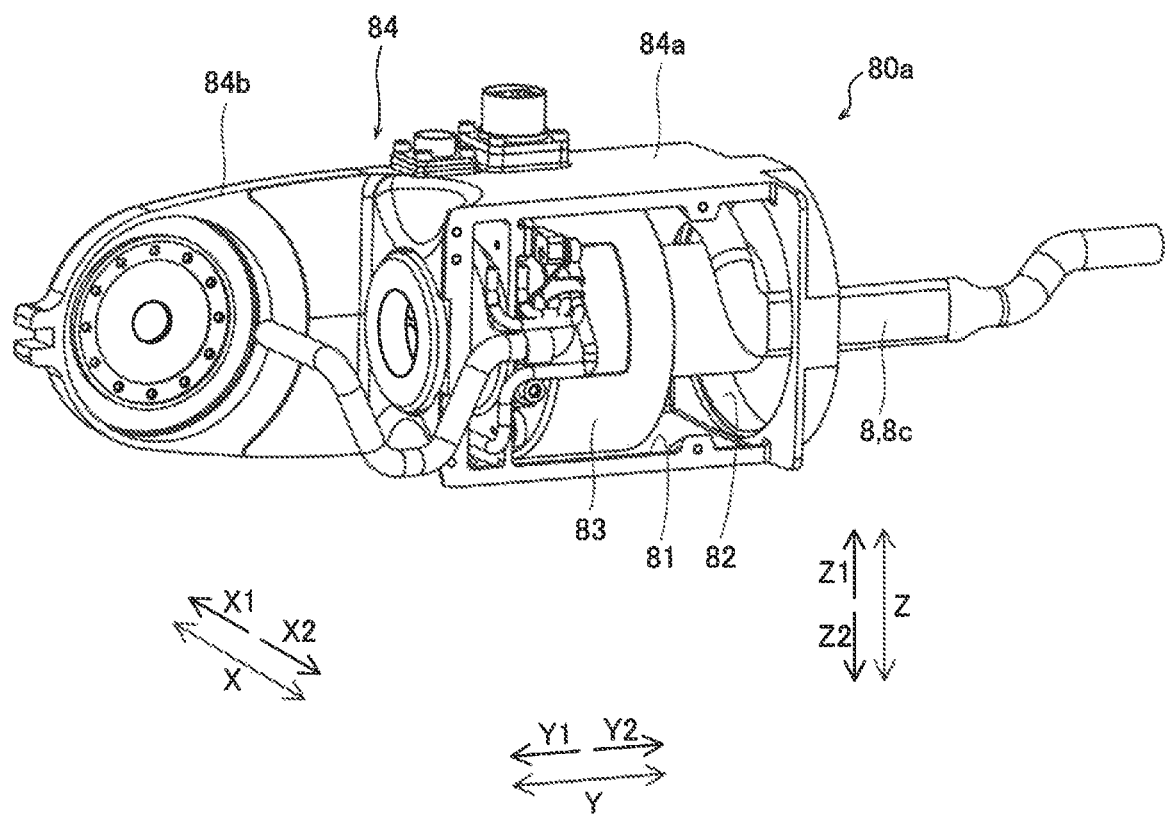
FIG. 13 is a perspective view showing a fourth joint axis portion wiring unit of the vertical articulated robot according to the first embodiment.
Figure 14:
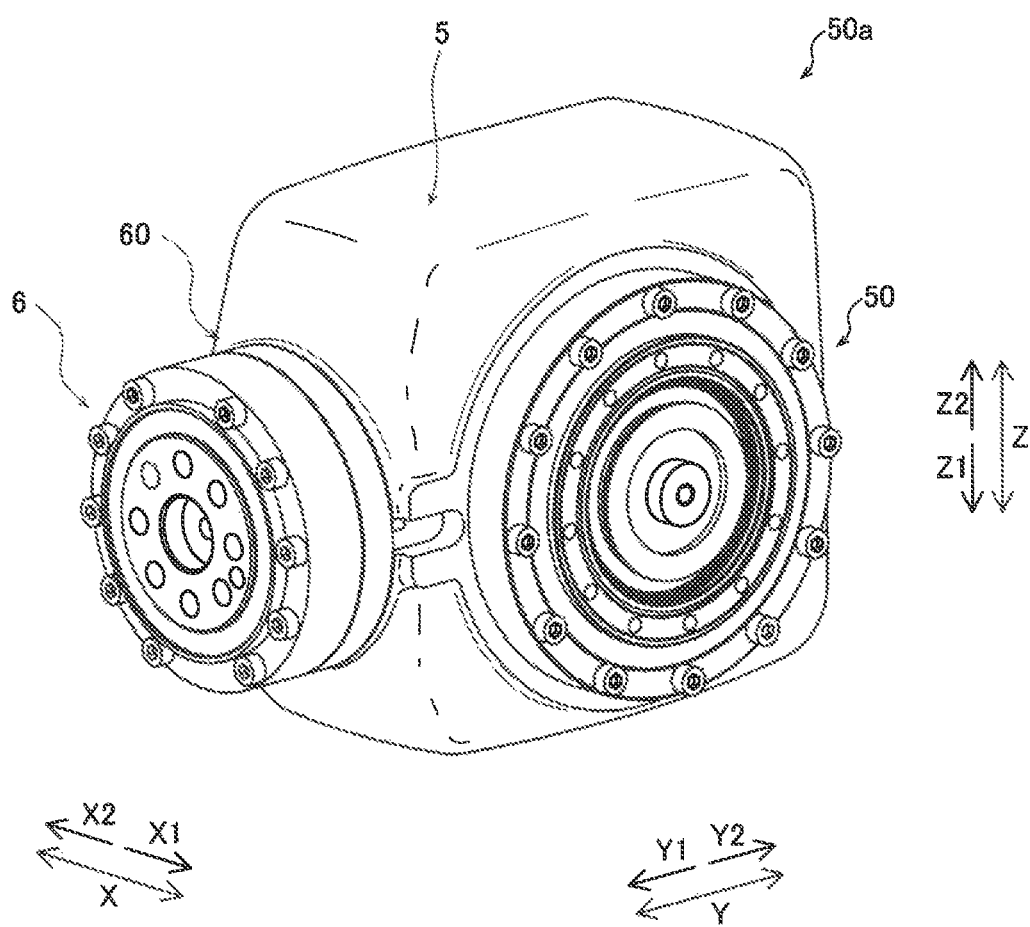
FIG. 14 is a perspective view showing a fifth and sixth joint axis portion unit of the vertical articulated robot according to the first embodiment.
Figure 15:
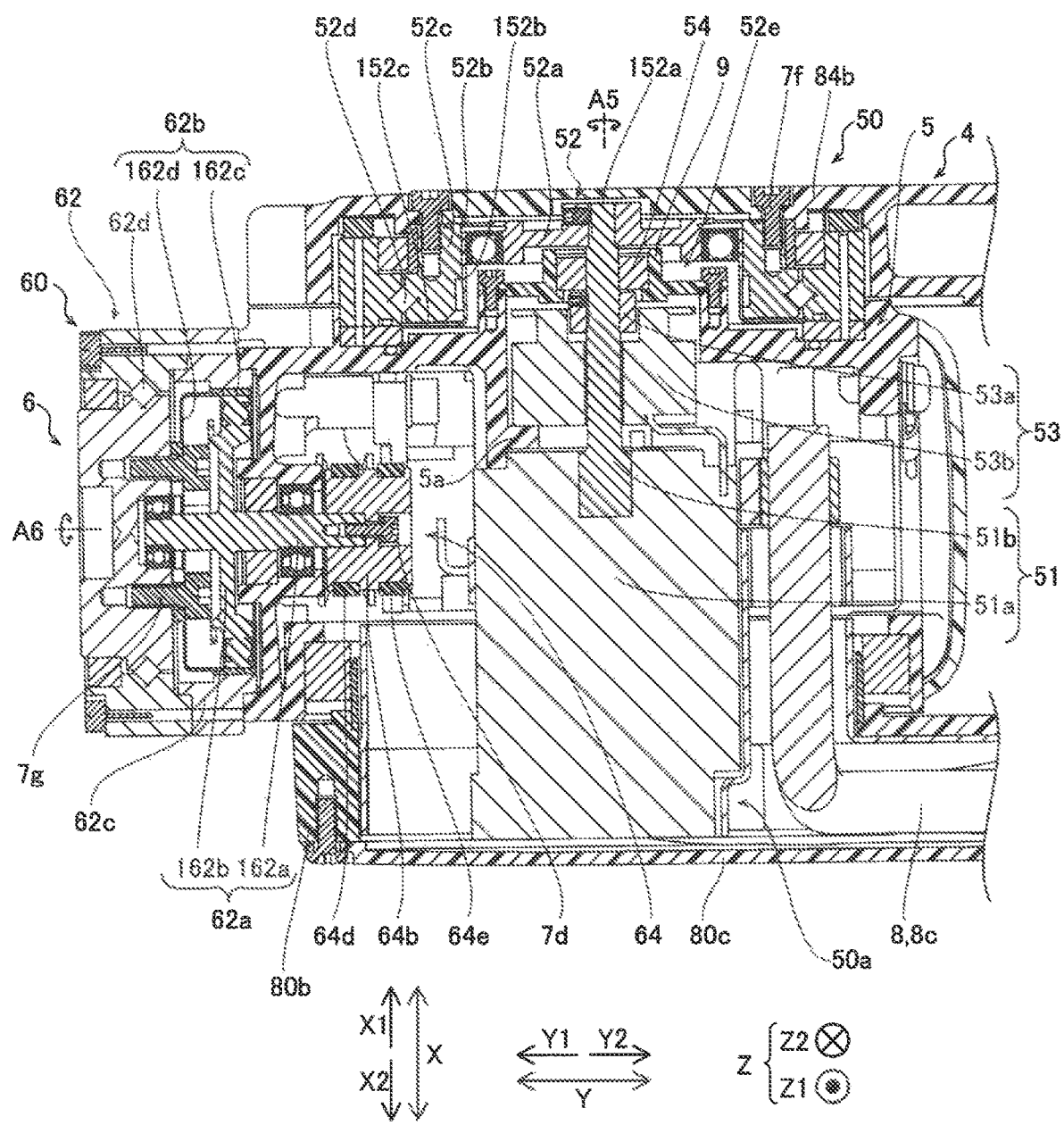
FIG. 15 is a sectional view showing the fifth and sixth joint axis portion unit of the vertical articulated robot according to the first embodiment.
Figure 16:
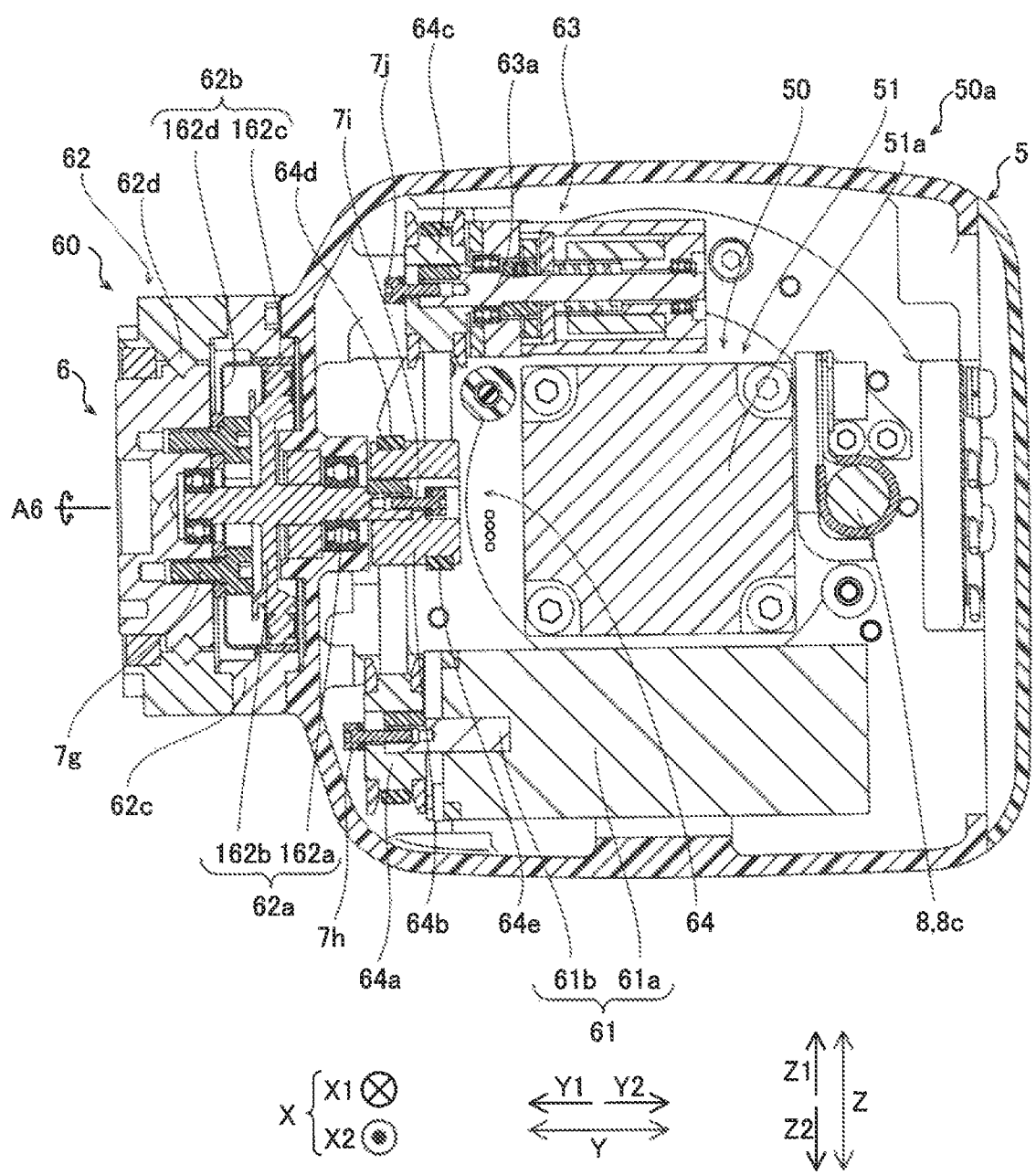
FIG. 16 is a sectional view showing the fifth and sixth joint axis portion unit of the vertical articulated robot according to the first embodiment.

As shown in FIGS. 2, 12, and 13, the third portion 8c of the wiring portion 8 is arranged in the fourth joint axis portion wiring unit 80a. A first end of the third portion 8c of the wiring portion 8 is arranged in the fifth and sixth joint axis portion unit 50a, and a second end thereof is connected to the second portion 8b (see FIG. 6, for example) of the wiring portion 8. The first end of the third portion 8c of the wiring portion 8 is inserted and arranged in the fifth and sixth joint axis portion unit 50a via an opening 81 of the fourth joint axis portion wiring unit 80a and the sub-arm 80b (not shown in FIG. 13). Furthermore, the second end of the third portion 8c of the wiring portion 8 is inserted and arranged in the third arm 3 via an opening 82 of the fourth joint axis portion wiring unit 80a.

The fourth joint axis portion wiring unit 80a integrally includes a wiring arrangement portion 83 and an exterior portion 84 that holds the wiring arrangement portion 83. The wiring arrangement portion 83 partitions the third portion 8c of the wiring portion 8 from the exterior portion 84 and holds the third portion 8c. The wiring arrangement portion 83 is made of a low-friction resin material in order to significantly reduce or prevent rubbing of the third portion 8c of the wiring portion 8. The third portion 8c of the wiring portion 8 is arranged together with the wiring arrangement portion 43 of the fourth joint axis portion unit 40a in the wiring arrangement portion 83. In the wiring arrangement portion 83 and the wiring arrangement portion 43, the third portion 8c of the wiring portion 8 is arranged so as to have a folded portion. Specifically, in the wiring arrangement portion 83 and the wiring arrangement portion 43, the third portion 8c of the wiring portion 8 is arranged in a U shape as viewed in the X direction. Furthermore, the wiring arrangement portion 83 and the wiring arrangement portion 43 are configured as a movable portion and a fixed portion, respectively. The wiring arrangement portion 83 serving as the movable portion is arranged on the distal side (Y1 direction side) relative to the wiring arrangement portion 43 serving as the fixed portion, and can move according to rotation of the fourth arm 4 around the rotation axis A4. The wiring arrangement portion 43 serving as the fixed portion is arranged on the side (Y2 direction side) opposite to the distal side relative to the wiring arrangement portion 83 serving as the movable portion, and is fixed to the holding member 44 of the fourth joint axis portion unit 40a so as not to move. The exterior portion 84 forms an exterior portion of the fourth joint axis portion wiring unit 80a.

In the first embodiment, the fourth joint axis portion wiring unit 80a also serves as the fourth arm 4. Specifically, the exterior portion 84 of the fourth joint axis portion wiring unit 80a also serves as the fourth arm 4. The exterior portion 84 includes a housing portion 84a to house the wiring arrangement portion 83 and a holder 84b that extends from the housing portion 84a toward the distal side (Y1 direction side) and rotatably holds the fifth and sixth joint axis portion unit 50a.

As shown in FIG. 2, the sub-arm 80b and the cover 80c are detachably provided on the fourth joint axis portion wiring unit 80a and the fifth and sixth joint axis portion unit 50a. The sub-arm 80b is formed as an arm body of the fourth arm 4 on the X2 direction side. The cover 80c exposes the third portion 8c of the wiring portion 8 to the outside when the cover 80c is removed from the fourth joint axis portion wiring unit 80a. When the cover 80c is attached to the fourth joint axis portion wiring unit 80a, the cover 80c partitions the third portion 8c of the wiring portion 8 from the outside and covers the third portion 8c.

Configuration of Fifth and Sixth Joint Axis Portion Unit

As shown in FIGS. 2 and 14 to 16, the fifth joint axis portion 50 and the sixth joint axis portion 60 corresponding to the wrist structure form a fifth and sixth joint axis portion unit 50a integrally including the fifth joint axis portion 50, the sixth joint axis portion 60, the fifth arm 5, and the sixth arm 6. The fifth and sixth joint axis portion unit 50a is attachable and attachable while integrally including the fifth joint axis portion 50, the sixth joint axis portion 60, the fifth arm 5, and the sixth arm 6.

The fifth joint axis portion 50 includes a motor 51, a speed reducer 52, a brake 53, and an oil seal 54. The motor 51 and the speed reducer 52 are examples of a "third motor" and a "third speed reducer" in the claims, respectively.

The motor 51 generates a driving force to rotationally drive the fifth arm 5. The motor 51 is attached to the fifth arm 5 by a fixing tool such as a screw (not shown). The motor 51 includes a housing 51a and a solid motor shaft 51b. The housing 51a houses a stator, a rotor, etc. On the other hand, the housing 51a does not house a brake and an oil seal. That is, the motor 51 is a motor without a brake and an oil seal, which does not include the brake and the oil seal in the housing 51a. Therefore, the housing 51a of the motor 51 has a smaller length in an axial direction (X direction) than a housing of a motor with a brake and an oil seal, which includes the brake and the oil seal in the housing. The motor shaft 51b is an output shaft of the motor 51, and extends along a direction (X direction) in which the rotation axis A5 extends. The motor shaft 51b is directly connected to the speed reducer 52. The motor shaft 51b is an example of a "third motor shaft" in the claims.

The speed reducer 52 is arranged coaxially with the motor 51 and is directly connected to the motor shaft 51b of the motor 51. The speed reducer 52 is a wave gear speed reducer including a wave generator 52a, a flexspline 52b, and a circular spline 52c. The wave generator 52a is an input of the speed reducer 52, and the motor shaft 51b is inserted into a through-hole 152a for connection such that the wave generator 52a is connected to the motor shaft 51b. The flexspline 52b is an output of the speed reducer 52 and is connected to the fifth arm 5. The circular spline 52c is a fixed portion of the speed reducer 52 and is attached to the fourth arm 4. Furthermore, the speed reducer 52 includes a bearing 52d. The bearing 52d rotatably holds the flexspline 52b with respect to the circular spline 52c. The bearing 52d is a cross-roller bearing.

The wave generator 52a has an elliptical disk shape including the through-hole 152a for inserting the motor shaft 51b at the center of rotation. The wave generator 52a is press-fitted into a cylindrical portion 152b of the flexspline 52b described below. The flexspline 52b includes the cylindrical portion 152b and a flange 152c. The cylindrical portion 152b has a hollow shape and extends along the direction (X direction) in which the rotation axis A5 extends. The cylindrical portion 152b includes external teeth that mesh with internal teeth of the circular spline 52c. The flange 152c has an annular shape and extends outward (to a side away from the center of rotation) from an end of the cylindrical portion 152b on the motor 51 side (X2 direction side). The circular spline 52c has an annular shape and includes the internal teeth that mesh with the external teeth of the flexspline 52b.

The flexspline 52b, which is the output of the speed reducer 52, is attached to the fifth arm 5 by a fixing tool such as a screw (not shown) at the flange 152c. Furthermore, the circular spline 52c, which is the fixed portion of the speed reducer 52, is attached to the fourth arm 4 by a fixing tool 7f such as a screw.

The brake 53 holds the motor 51. The brake 53 is a non-excitation actuated electromagnetic brake that holds the motor 51 when it is not energized and releases the holding of the motor 51 when it is energized. A brake hub 53a of the brake 53 is attached to a central portion of the motor shaft 51b by a set screw. A main body 53b of the brake 53 is attached to a brake holder 5a of the fifth arm 5 by a fixing tool such as a screw (not shown). The oil seal 54 seals the grease of the speed reducer 52. The oil seal 54 is mounted on the motor shaft 51b. The oil seal 54 is held by an oil seal holder 9 provided separately from the fourth arm 4 and the fifth arm 5.

The brake 53 and the oil seal 54 are provided outside the housing 51a of the motor 51, separately from the motor 51. The brake 53 and the oil seal 54 are arranged between the housing 51a of the motor 51 and the wave generator 52a of the speed reducer 52 in the direction (X direction) in which the rotation axis A5 extends. The brake 53 and the oil seal 54 are arranged on the motor 51 side (X2 direction side) relative to the wave generator 52a of the speed reducer 52. The brake 53 and the oil seal 54 are arranged in this order from the motor 51 side (X2 direction side) toward the speed reducer 52 side (X1 direction side).

The speed reducer 52 includes a recess 52e that is recessed along the direction (X direction) in which the rotation axis A5 extends. The recess 52e is defined by at least the wave generator 52a, the flexspline 52b, the circular spline 52c, and the bearing 52d. Specifically, the bottom of the recess 52e is defined by the wave generator 52a. A side of the recess 52e is defined by the flexspline 52b, the circular spline 52c, and the bearing 52d. The speed reducer 52 includes the recess 52e on the motor 51 side (X2 direction side). That is, the recess 52e is recessed from the motor 51 side (X2 direction side) toward the speed reducer 52 side (X1 direction side).

At least a portion (a portion on the X1 direction side) of the brake 53 and the oil seal 54 are arranged inside the recess 52e. That is, at least the portion of the brake 53 and the oil seal 54 are arranged so as to fit inside the recess 52e. Thus, at least the portion of the brake 23 and the oil seal 24 can be arranged using the recess 22e, and thus as compared with a case in which a motor with a brake is used for the fifth joint axis portion 50, the fifth and sixth joint axis portion unit 50a can be downsized in the axial direction (X direction). At least the portion of the brake 53 and the oil seal 54 overlap the recess 52e (the cylindrical portion 152b of the flexspline 52b, the circular spline 52c, and the bearing 52d) as viewed in a direction (such as the Y direction or Z direction) orthogonal to the direction in which the rotation axis A5 extends.

Similarly, the oil seal holder 9 is also arranged inside the recess 52e. That is, the oil seal holder 9 is also arranged so as to fit inside the recess 52e. The oil seal holder 9 also overlaps the recess 52e (the cylindrical portion 152b of the flexspline 52b, the circular spline 52c, and the bearing 52d) as viewed in the direction (such as the Y direction or Z direction) orthogonal to the direction in which the rotation axis A5 extends.

The sixth joint axis portion 60 includes a motor 61, a speed reducer 62, a brake 63, and a belt mechanism 64. The motor 61 and the speed reducer 62 are examples of a "second motor" and a "second speed reducer" in the claims, respectively.

The motor 61 generates a driving force to rotationally drive the sixth arm 6 that is a tool flange. The motor 61 is attached to the fifth arm 5 by a fixing tool such as a screw (not shown). The motor 61 includes a housing 61a and a solid motor shaft 61b. The housing 61a houses a stator, a rotor, etc. On the other hand, the housing 61a does not house a brake. That is, the motor 61 is a brakeless motor, which does not include the brake in the housing 61a. Therefore, the housing 61a of the motor 61 has a smaller length in an axial direction (Y direction) than a housing of a motor with a brake, which includes the brake in the housing. The motor shaft 61b is an output shaft of the motor 61 and extends along a direction (Y direction) in which a rotation axis A6 extends. The motor shaft 61b is connected to the speed reducer 62 via the belt mechanism 64. The motor shaft 61b is an example of a "second motor shaft" in the claims.

The speed reducer 62 is arranged such that the axis thereof does not overlap the axis of the motor 61 and is connected to the motor shaft 61b of the motor 61 via the belt mechanism 64. The speed reducer 62 is a wave gear speed reducer including a wave generator 62a, a flexspline 62b, and a circular spline 62c. The wave generator 62a is an input of the speed reducer 62, and an input shaft 162a is connected to a pulley 64b of the belt mechanism 64 described below such that the wave generator 62a is connected to the motor shaft 61b via the belt mechanism 64. The flexspline 62b is an output of the speed reducer 62 and is connected to the sixth arm 6. The circular spline 62c is a fixed portion of the speed reducer 62 and is attached to the fifth arm 5. The speed reducer 62 includes a bearing 62d. The bearing 62d rotatably holds the flexspline 62b with respect to the circular spline 62c. The bearing 62d is a cross-roller bearing.

The wave generator 62a includes the input shaft 162a and a disk 162b. The disk 162b of the wave generator 62a is press-fitted into a cylindrical portion 162c of the flexspline 62b described below. The flexspline 62b has a cup shape and includes the cylindrical portion 162c that is a side of the cup and a bottom 162d of the cup. The cylindrical portion 162c has a hollow shape and extends along the direction (Y direction) in which the rotation axis A6 extends. The cylindrical portion 162c includes external teeth that mesh with internal teeth of the circular spline 62c. The bottom 162d extends inward (to a side closer to the center of rotation) from an end of the cylindrical portion 162c on a side (Y1 direction side) opposite to the motor 61 side. The circular spline 62c has an annular shape and includes the internal teeth that mesh with the external teeth of the flexspline 62b.

The flexspline 62b, which is the output of the speed reducer 62, is attached to the sixth arm 6 by a fixing tool 7g such as a screw at the bottom 162d. Furthermore, the circular spline 62c, which is the fixed portion of the speed reducer 62, is attached to the fifth arm 5 by a fixing tool such as a screw (not shown).

The brake 63 holds the motor 61. The brake 63 is a non-excitation actuated electromagnetic brake that holds the motor 61 when it is not energized and releases the holding of the motor 61 when it is energized. The brake 63 is provided outside the housing 61a of the motor 61 separately from the motor 61. The brake 63 and the motor 61 are arranged so as to face each other across the motor 51.

The belt mechanism 64 transmits the driving force of the motor 61 to the speed reducer 62. The belt mechanism 64 transmits the holding force of the brake 63 to the motor 61. The belt mechanism 64 includes a plurality of (three) pulleys 64a to 64c and a plurality of (two) belts 64d and 64e. The pulley 64a is attached to the motor shaft 61b by a fixing tool 7h such as a screw. The pulley 64b is attached to the input shaft 162a of the wave generator 62a by a fixing tool 7i such as a screw. The pulley 64c is attached to an input shaft 63a of the brake 63 by a fixing tool 7j such as a screw. The belt 64d is mounted between the pulley 64a and the pulley 64b. The belt 64e is mounted between the pulley 64b and the pulley 64c. At least a portion (the pulley 64b, the belt 64d, the belt 64e, etc.) of the belt mechanism 64 is arranged between the speed reducer 62 and the motor 51. The size of the belt mechanism 64 in the Y direction is smaller than the size of the motor 61 in the Y direction.

The fifth and sixth joint axis portion unit 50a integrally includes the motor 51, the speed reducer 52, the brake 53, and the oil seal 54 of the fifth joint axis portion 50, the motor 61, the speed reducer 62, the brake 63, and the belt mechanism 64 of the sixth joint axis portion 60, the oil seal holder 9, the fifth arm 5, and the sixth arm 6. The fifth and sixth joint axis portion unit 50a is attachable and attachable while integrally including the motor 51, the speed reducer 52, the brake 53, and the oil seal 54 of the fifth joint axis portion 50, the motor 61, the speed reducer 62, the brake 63, and the belt mechanism 64 of the sixth joint axis portion 60, the oil seal holder 9, the fifth arm 5, and the sixth arm 6.

Assembly of Vertical Articulated Robot

An example of a method for assembling the vertical articulated robot 100 is now described with reference to FIG. 2. As shown in FIG. 2, first, the second joint axis portion unit 20a is attached to the first arm 1 of the first joint axis portion unit 10a. Then, the first arm body 2a of the second arm 2 is attached to the second joint axis portion unit 20a attached to the first arm 1 of the first joint axis portion unit 10a. Then, the third joint axis portion unit 30a is attached to the third arm 3. Then, the third joint axis portion unit 30a attached to the third arm 3 is attached to the first arm body 2a of the second arm 2 attached to the second joint axis portion unit 20a. Then, the second joint axis portion wiring unit 70a serving as the second arm body 2b of the second arm 2 is attached to the first arm 1 of the first joint axis portion unit 10a and the third arm 3. Then, the cover 70b is attached to the second joint axis portion wiring unit 70a.

Then, the fourth joint axis portion unit 40a is attached to the third arm 3. Then, the fourth joint axis portion wiring unit 80a is attached to the fourth joint axis portion unit 40a attached to the third arm 3. Then, the fifth and sixth joint axis portion unit 50*a* is attached to the fourth joint axis portion wiring unit 80*a* attached to the fourth joint axis portion unit 40*a*. Then, the sub-arm 80*b* and the cover 80*c* are attached to the fourth joint axis portion wiring unit 80*a* and the fifth and sixth joint axis portion unit 50*a*. Thus, the vertical articulated robot 100 is assembled.

During the assembly of the vertical articulated robot 100, wiring work for the wiring portion 8 is appropriately performed. Specifically, with the cover 10*c* with a wiring connector being removed, wiring connection work between the first portion 8*a* of the wiring portion 8 and the motor 11 and wiring connection work between the first portion 8*a* of the wiring portion 8 and the connectors 10*d*, for example, are performed. With the wiring maintenance cover 10*e* being removed, wiring connection work between the first portion 8*a* and the second portion 8*b* of the wiring portion 8 and wiring connection work between the wiring portion 8 and the motor 21, for example, are performed. With the wiring maintenance cover 30*b* being removed, wiring connection work between the second portion 8*b* and the third portion 8*c* of the wiring portion 8 and wiring connection work between the wiring portion 8 and both the motor 31 and the motor 41, for example, are performed. With the cover 80*c* being removed, wiring connection work between the third portion 8*c* of the wiring portion 8 and both the motor 51 and the motor 61, for example, is performed. After the wiring connection work is completed, each cover is attached.

Advantageous Effects of First Embodiment

According to the first embodiment, the following advantageous effects are achieved.

According to the first embodiment, as described above, the vertical articulated robot 100 includes the wiring units 70*a* and 80*a*, and the joint axis portion unit 10*a* (20*a*, 30*a*, 40*a*, 50*a*) integrally includes the motor 11 (21, 31, 41, 51) including the solid motor shaft 11*b* (21*b*, 31*b*, 41*b*, 51*b*), and the speed reducer 12 (22, 32, 42, 52) directly connected to the motor shaft 11*b* (21*b*, 31*b*, 41*b*, 51*b*). Accordingly, the motor 11 (21, 31, 41, 51) and the speed reducer 12 (22, 32, 42, 52) can be downsized as compared with a case in which wiring is inserted through a hollow portion of the motor shaft, and thus the joint axis portion unit 10*a* (20*a*, 30*a*, 40*a*, 50*a*) can be downsized by a decrease in the sizes of the motor 11 (21, 31, 41, 51) and the speed reducer 12 (22, 32, 42, 52). Furthermore, the inertia (moment of inertia) around the rotation axis of the input of the joint axis portion unit 10*a* (20*a*, 30*a*, 40*a*, 50*a*) can be decreased as compared with a case in which the wiring is inserted through the hollow portion of the motor shaft, and thus the rotational speed and rotational acceleration of the joint axis portion unit 10*a* (20*a*, 30*a*, 40*a*, 50*a*) can be increased by a decrease in the inertia around the rotation axis of the input of the joint axis portion unit 10*a* (20*a*, 30*a*, 40*a*, 50*a*). Consequently, the rotational speed and rotational acceleration of the joint axis portion unit 10*a* (20*a*, 30*a*, 40*a*, 50*a*) can be increased while the joint axis portion unit 10*a* (20*a*, 30*a*, 40*a*, 50*a*) is downsized.

According to the first embodiment, as described above, the vertical articulated robot 100 includes the plurality of joint axis portion units 10*a* to 50*a* and the wiring units 70*a* and 80*a*. Accordingly, the vertical articulated robot 100 can be assembled and maintained (the units can be replaced, for example) unit by unit, and thus the vertical articulated robot 100 can be easily assembled and maintained.

According to the first embodiment, as described above, the fifth and sixth joint axis portion unit 50*a* is a unit integrally including the sixth joint axis portion 60 to which the tool 6*a* is attached and the fifth joint axis portion 50 connected to the side opposite to the distal side of the sixth joint axis portion 60. Accordingly, two of the sixth joint axis portion 60 and the fifth joint axis portion 50 can be handled integrally, and thus the sixth joint axis portion 60 and the fifth joint axis portion 50 can be easily assembled and maintained as compared with a case in which the sixth joint axis portion 60 and the fifth joint axis portion 50 cannot be handled integrally. Consequently, the vertical articulated robot 100 can be more easily assembled and maintained.

According to the first embodiment, as described above, the sixth joint axis portion 60 includes the motor 61 including the motor shaft 61*b*, and the speed reducer 62 connected to the motor shaft 61*b* via the belt mechanism 64. Furthermore, the fifth joint axis portion 50 includes the motor 51 including the solid motor shaft 51*b*, and the speed reducer 52 directly connected to the motor shaft 51*b*. Moreover, the fifth and sixth joint axis portion unit 50*a* integrally includes the motor 61, the belt mechanism 64, the speed reducer 62, the motor 51, and the speed reducer 52. Accordingly, the motor 61, the belt mechanism 64, and the speed reducer 62 of the sixth joint axis portion 60, and the motor 51 and the speed reducer 52 of the fifth joint axis portion 50 can be handled integrally, and thus the motor 61, the belt mechanism 64, and the speed reducer 62 of the sixth joint axis portion 60, and the motor 51 and the speed reducer 52 of the fifth joint axis portion 50 can be easily assembled and maintained. Furthermore, even when the belt mechanism 64 that requires adjustment of the belt tension is provided, the fifth and sixth joint axis portion unit 50*a* being used for the fifth and sixth joint axis portion unit 50*a* including the belt mechanism 64 with the belt tension being adjusted can be replaced, and thus it is not necessary to adjust the belt tension of the belt mechanism 64 at the time of replacement. Consequently, as compared with a case in which the belt tension of the belt mechanism 64 is adjusted at the time of replacement, the fifth and sixth joint axis portion unit 50*a* including the belt mechanism 64 can be easily replaced.

According to the first embodiment, as described above, the wiring unit 70*a* (80*a*) also serves as the arm 2 (4). Accordingly, the wiring unit 70*a* (80*a*) can also serve as the arm 2 (4), and thus as compared with a case in which the wiring unit 70*a* (80*a*) is provided separately from the arm 2 (4), the structure for the wiring unit 70*a* (80*a*) can be simplified. Consequently, even when the wiring unit 70*a* (80*a*) is provided, the complexity of the structure and an increase in the number of components can be significantly reduced or prevented.

According to the first embodiment, as described above, the wiring unit 70*a* (80*a*) integrally includes the wiring arrangement portion 73 (83) and the exterior portion 74 (84) that holds the wiring arrangement portion 73 (83) and also serves as the arm 2 (4). Accordingly, while the wiring portion 8 is reliably arranged in the wiring arrangement portion 73 (83), the complexity of the structure and an increase in the number of components can be significantly reduced or prevented by the exterior portion 74 (84) that also serves as the arm 2 (4).

According to the first embodiment, as described above, the arm 2 includes the pair of arm bodies 2*a* and 2*b* including the first arm body 2*a* that receives a driving force from the motor 21 and the second arm body 2*b* arranged so as to face the first arm body 2*a* not to receive a driving force from the motor 21. Furthermore, the wiring unit 70*a* also serves as the second arm body 2*b* of the pair of arm bodies 2*a* and 2*b*. Accordingly, the wiring unit 70*a* can also serve as the second arm body 2*b* that does not directly receive a driving force from the motor 21, and thus even when the wiring unit 70*a* also serves as the arm 2, the complexity of the structure of the wiring unit 70a that also serves as the arm 2 can be effectively significantly reduced or prevented as compared with a case in which the wiring unit 70a also serves as the first arm body 2a that receives a driving force from the motor 21.

According to the first embodiment, as described above, the joint axis portion unit 20a (30a, 50a) integrally includes the motor 21 (31, 51), which is a motor that does not include a brake, the speed reducer 22 (32, 52), and the brake 23 (33, 53) arranged on the motor 21 (31, 51) side relative to the speed reducer 22 (32, 52) to hold the motor 21 (31, 51). Accordingly, the motor 21 (31, 51) can be downsized as compared with a case in which the motor 21 (31, 51) is a motor with a brake. Furthermore, the brake 23 (33, 53) can be arranged on the motor 21 (31, 51) side, and thus the brake 23 (33, 53) can be arranged as close to the motor 21 (31, 51) as possible. Consequently, the motor 21 (31, 51) can be stably held by the brake 23 (33, 53).

Second Embodiment

A second embodiment is now described with reference to FIGS. 17 to 22. In this second embodiment, an example in which brakes of a second joint axis portion unit and a third joint axis portion unit are arranged on the side opposite to the motor side relative to a speed reducer is described unlike the first embodiment in which the brakes of the second joint axis portion unit and the third joint axis portion unit are arranged on the motor side relative to the speed reducer. In the figures, the same or similar configurations as those of the first embodiment are denoted by the same reference numerals, and description thereof is omitted.

Configuration of Vertical Articulated Robot

Figure 17:
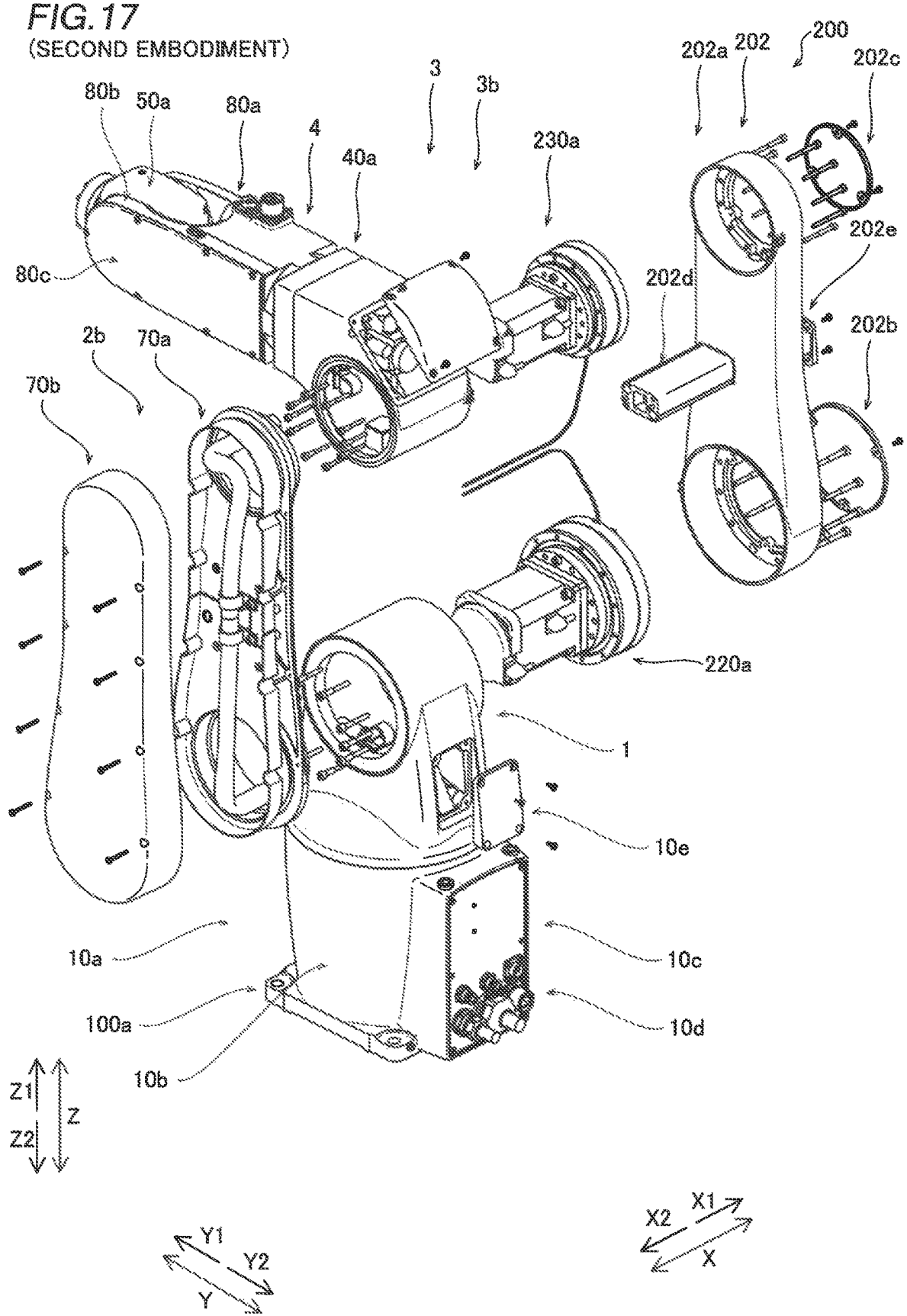
FIG. 17 is an exploded perspective view showing the overall configuration of a vertical articulated robot according to a second embodiment.

As shown in FIG. 17, a vertical articulated robot 200 according to the second embodiment is different from the vertical articulated robot 100 according to the first embodiment in that the vertical articulated robot 200 includes a second arm 202, a second joint axis portion unit 220a, and a third joint axis portion unit 330a. The second joint axis portion unit 320a and the third joint axis portion unit 330a are examples of a "joint axis portion unit" in the claims.

Configuration of Second Joint Axis Portion Unit

Figure 18:
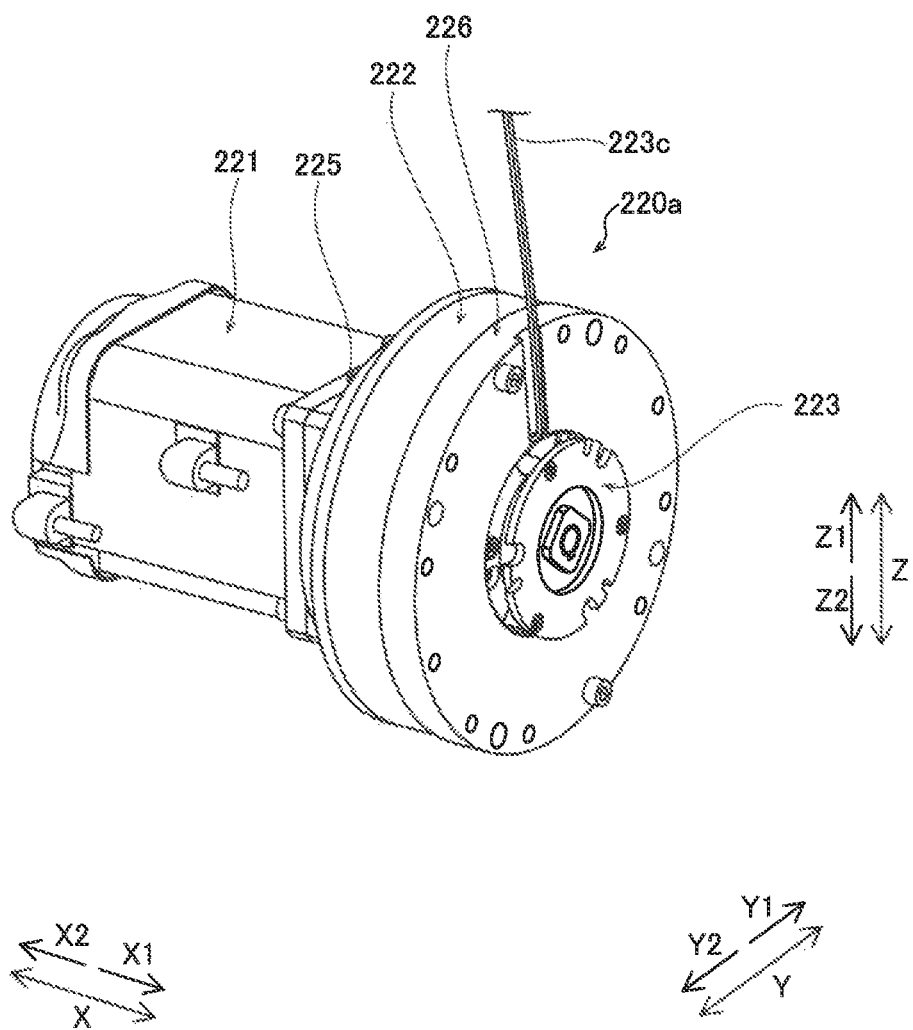
FIG. 18 is a perspective view showing a second joint axis portion unit of the vertical articulated robot according to the second embodiment.
Figure 19:
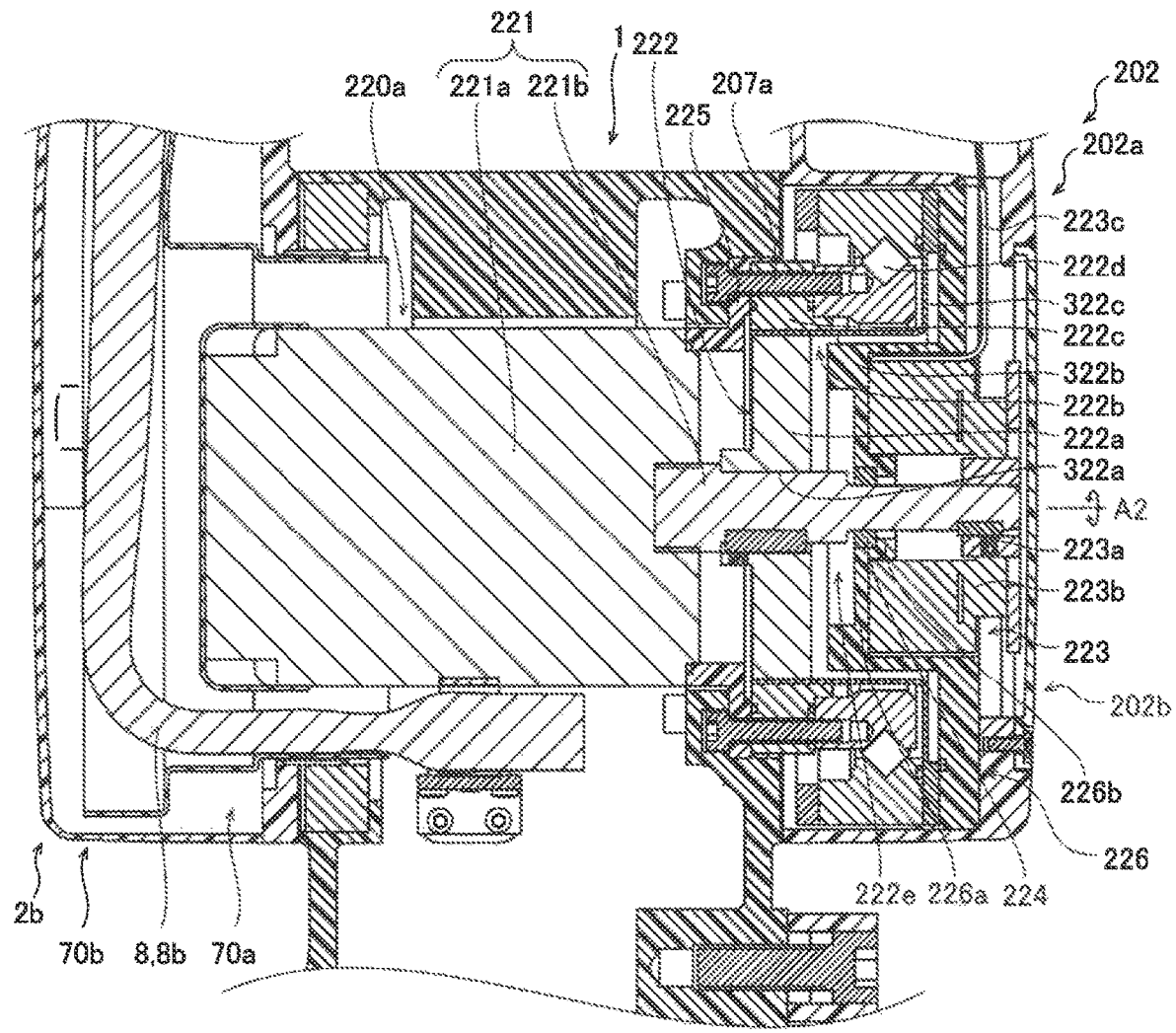
FIG. 19 is a sectional view showing the second joint axis portion unit of the vertical articulated robot according to the second embodiment.

As shown in FIGS. 17 to 19, the second joint axis portion unit 220a is a motor unit integrally including a motor 221, a speed reducer 222, a brake 223, an oil seal 224, and holding members 225 and 226 of a second joint axis portion 220. The second joint axis portion unit 220a is attachable and detachable while integrally including the motor 221, the speed reducer 222, the brake 223, the oil seal 224, and the holding members 225 and 226. The motor 221 and the speed reducer 222 are examples of a "first motor" and a "first speed reducer" in the claims, respectively.

The motor 221 generates a driving force to rotationally drive the second arm 202. The motor 221 includes a housing 221a and a solid motor shaft 221b. The housing 221a houses a stator, a rotor, etc. On the other hand, the housing 221a does not house a brake and an oil seal. That is, the motor 221 is a motor without a brake and an oil seal, which does not include the brake and the oil seal in the housing 221a. Therefore, the housing 221a of the motor 221 has a smaller length in an axial direction (X direction) than a housing of a motor with a brake and an oil seal, which includes the brake and the oil seal in the housing. The motor shaft 221b is an output shaft of the motor 221, and extends along a direction (X direction) in which a rotation axis A2 extends.

The motor shaft 221b is directly connected to the speed reducer 222. The motor shaft 221b is an example of a "first motor shaft" in the claims.

The speed reducer 222 is arranged coaxially with the motor 221 and is directly connected to the motor shaft 221b of the motor 221. The speed reducer 222 is a wave gear speed reducer including a wave generator 222a, a flexspline 222b, and a circular spline 222c. The wave generator 222a is an input of the speed reducer 222, and the motor shaft 221b is inserted into a through-hole 322a for connection such that the wave generator 222a is connected to the motor shaft 221b. The flexspline 222b is an output of the speed reducer 222 and is connected to the second arm 202 via the holding member 226. The circular spline 222c is a fixed portion of the speed reducer 222 and is attached to a first arm 1 via the holding member 225. Furthermore, the speed reducer 222 includes a bearing 222d. The bearing 222d rotatably holds the flexspline 222b with respect to the circular spline 222c. The bearing 222d is a cross-roller bearing.

The wave generator 222a has an elliptical disk shape including the through-hole 322a for inserting the motor shaft 221b at the center of rotation. The wave generator 222a is press-fitted into a cylindrical portion 322b of the flexspline 222b described below. The flexspline 222b includes the cylindrical portion 322b and a flange 322c. The cylindrical portion 322b has a hollow shape and extends along the direction (X direction) in which the rotation axis A2 extends. The cylindrical portion 322b includes external teeth that mesh with internal teeth of the circular spline 222c. The flange 322c has an annular shape and extends outward (to a side away from the center of rotation) from an end of the cylindrical portion 322b on the motor 221 side (X2 direction side). The circular spline 222c has an annular shape and includes the internal teeth that mesh with the external teeth of the flexspline 222b.

The flexspline 222b, which is the output of the speed reducer 222, is attached to the holding member 226 by a fixing tool such as a screw (not shown) at the flange 322c. The flexspline 222b is attached to the second arm 202 via the holding member 226 by a fixing tool (not shown). Furthermore, the circular spline 222c, which is the fixed portion of the speed reducer 222, is attached to the first arm 1 via the holding member 225 by a fixing tool such as a screw (not shown).

The brake 223 holds the motor 221. The brake 223 is a non-excitation actuated electromagnetic brake that holds the motor 221 when it is not energized and releases the holding of the motor 221 when it is energized. A brake hub 223a of the brake 223 is attached to a distal end of the motor shaft 221b by being fixed to the motor shaft 221b by a key and a set screw. A main body 223b of the brake 223 is attached to a brake holder 226a of the holding member 226 by a fixing tool such as a screw (not shown). The oil seal 224 seals the grease of the speed reducer 222. The oil seal 224 is mounted on the motor shaft 221b. The oil seal 224 is held by an oil seal holder 226b of the holding member 226.

The brake 223 and the oil seal 224 are provided outside the housing 221a of the motor 221 separately from the motor 221. The brake 223 and the oil seal 224 are arranged outside the housing 221a of the motor 221 and the wave generator 222a of the speed reducer 222 in the direction (X direction) in which the rotation axis A2 extends. The brake 223 and the oil seal 224 are arranged on the side (X1 direction side) opposite to the motor 221 side relative to the wave generator 222a of the speed reducer 222. The oil seal 224 and the brake 223 are arranged in this order from the motor 221 side (X2 direction side) toward the speed reducer 222 side (X1 direction side).

The holding members 225 and 226 integrally hold the motor 221, the speed reducer 222, the brake 223, and the oil seal 224. Specifically, the motor 221 is attached to the holding member 225 by a fixing tool such as a screw (not shown). The speed reducer 222 is attached to the holding member 225 by a fixing tool 207a such as a screw. The brake 223 is attached to the brake holder 226a of the holding member 226 by a fixing tool such as a screw (not shown). The oil seal 224 is held by the oil seal holder 226b of the holding member 226. While integrally including the motor 221, the speed reducer 222, the brake 223, the oil seal 224, and the holding members 225 and 226, the second joint axis portion unit 220a is attached to the first arm 1 via the holding member 225 by a fixing tool such as a screw (not shown) and is attached to the second arm 202 via the holding member 226 by a fixing tool such as a screw (not shown).

The speed reducer 222 includes a recess 222e that is recessed along the direction (X direction) in which the rotation axis A2 extends. The recess 222e is defined by at least the wave generator 222a, the flexspline 222b, the circular spline 222c, and the bearing 222d. Specifically, the bottom of the recess 222e is defined by the wave generator 222a. A side of the recess 222e is defined by the flexspline 222b, the circular spline 222c, and the bearing 222d. The speed reducer 222 includes the recess 222e on the side (X1 direction side) opposite to the motor 221 side. That is, the recess 222e is recessed from the speed reducer 222 side (X1 direction side) toward the motor 221 side (X2 direction side).

At least a portion (a portion on the X2 direction side) of the brake 223 and the oil seal 224 are arranged inside the recess 222e. That is, at least the portion of the brake 223 and the oil seal 224 are arranged so as to fit inside the recess 222e. Thus, at least the portion of the brake 223 and the oil seal 224 can be arranged using the recess 222e, and thus the second joint axis portion unit 220a can be downsized in the axial direction (X direction) as compared with a case in which a motor with a brake is used for the second joint axis portion unit 220a. At least the portion of the brake 223 and the oil seal 224 overlap the recess 222e (the cylindrical portion 322b of the flexspline 222b and the bearing 222d) as viewed in a direction (such as the Y direction or Z direction) orthogonal to the direction in which the rotation axis A2 extends.

Similarly, the brake holder 226a and the oil seal holder 226b of the holding member 226 are arranged inside the recess 222e. That is, the brake holder 226a and the oil seal holder 226b are arranged so as to fit inside the recess 222e. The brake holder 226a and the oil seal holder 226b overlap the recess 222e (the cylindrical portion 322b of the flexspline 222b and the bearing 222d) as viewed in the direction (such as the Y direction or Z direction) orthogonal to the direction in which the rotation axis A2 extends.

In the second embodiment, a first arm body 202a of the second arm 202 includes a brake maintenance cover 202b at a position facing the brake 223. The brake maintenance cover 202b is detachably provided on the first arm body 202a of the second arm 202. When the brake maintenance cover 202b is removed from the first arm body 202a of the second arm 202, the brake 223 is exposed to the outside together with the fixing tool of the brake 223, for example. Thus, maintenance of the brake 223 such as replacement of the brake 223 can be easily performed. When attached to the first arm body 202a of the second arm 202, the brake maintenance cover 202b covers the brake 223. The brake 223 is arranged in the vicinity of or adjacent to the outer surface of the first arm body 202a of the second arm 202.

Configuration of Third Joint Axis Portion Unit

Figure 20:
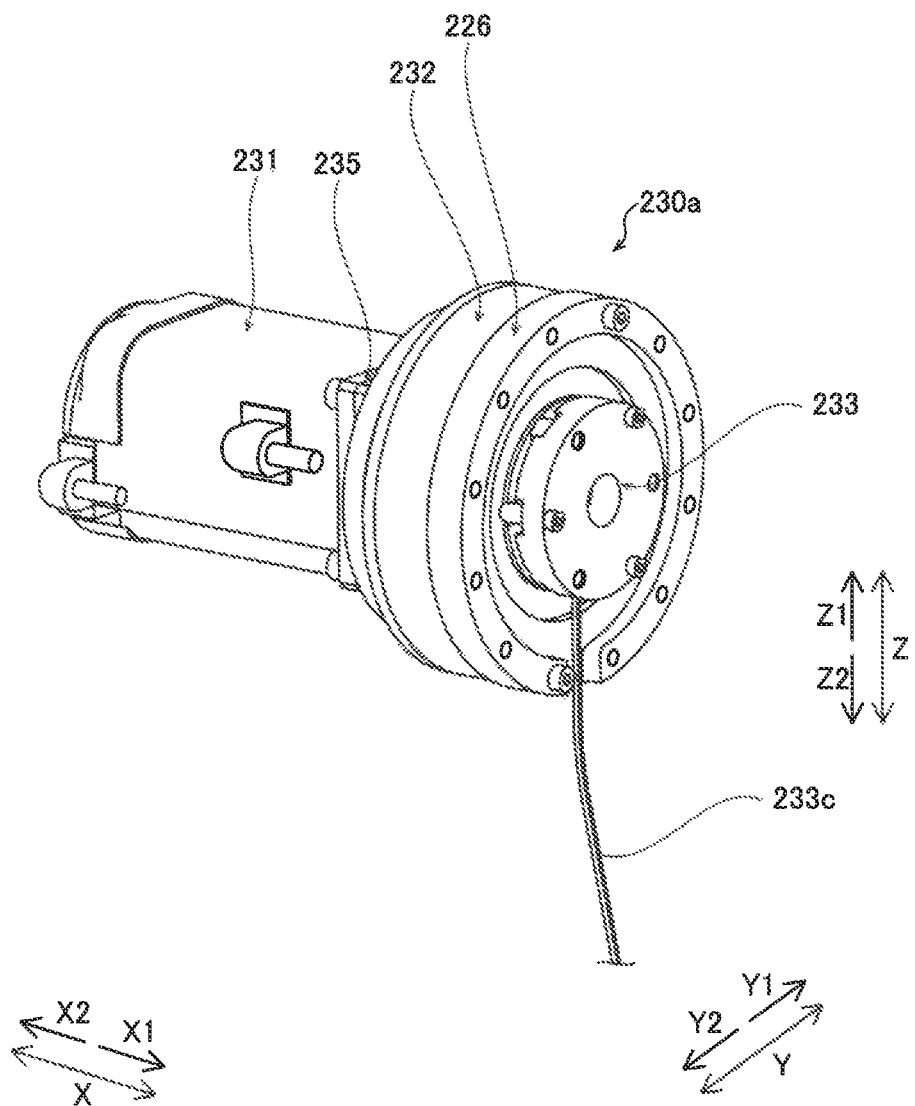
FIG. 20 is a perspective view showing a third joint axis portion unit of the vertical articulated robot according to the second embodiment.

As shown in FIGS. 17, 20, and 21, the third joint axis portion unit 230a is a motor unit integrally including a motor 231, a speed reducer 232, a brake 233, an oil seal 234, and holding members 235 and 236 of a second joint axis portion 220. The third joint axis portion unit 230a is attachable and detachable while integrally including the motor 231, the speed reducer 232, the brake 233, the oil seal 234, and the holding members 235 and 236. The motor 231 and the speed reducer 232 are examples of a "first motor" and a "first speed reducer" in the claims, respectively.

The motor 231 generates a driving force to rotationally drive a third arm 3. The motor 231 includes a housing 231a and a solid motor shaft 231b. The housing 231a houses a stator, a rotor, etc. On the other hand, the housing 231a does not house a brake and an oil seal. That is, the motor 231 is a motor without a brake and an oil seal, which does not include the brake and the oil seal in the housing 231a. Therefore, the housing 231a of the motor 231 has a smaller length in an axial direction (X direction) than a housing of a motor with a brake and an oil seal, which includes the brake and the oil seal in the housing. The motor shaft 231b is an output shaft of the motor 231, and extends along a direction (X direction) in which a rotation axis A3 extends. The motor shaft 231b is directly connected to the speed reducer 232. The motor shaft 231b is an example of a "first motor shaft" in the claims.

The speed reducer 232 is arranged coaxially with the motor 231 and is directly connected to the motor shaft 231b of the motor 231. The speed reducer 232 is a wave gear speed reducer including a wave generator 232a, a flexspline 232b, and a circular spline 232c. The wave generator 232a is an input of the speed reducer 232, and the motor shaft 231b is inserted into a through-hole 332a for connection such that the wave generator 232a is connected to the motor shaft 231b. The flexspline 232b is a fixed portion of the speed reducer 232 and is attached to the second arm 202 via the holding member 236. The circular spline 232c is an output of the speed reducer 232 and is connected to the third arm 3 via the holding member 235. Furthermore, the speed reducer 232 includes a bearing 232d. The bearing 232d rotatably holds the circular spline 232c with respect to the flexspline 232b. The bearing 232d is a cross-roller bearing.

The wave generator 232a has an elliptical disk shape including the through-hole 332a for inserting the motor shaft 231b at the center of rotation. The wave generator 232a is attached to the flexspline 232b by being press-fitted into a cylindrical portion 332b of the flexspline 232b described below. The flexspline 232b includes the cylindrical portion 332b and a flange 332c. The cylindrical portion 332b has a hollow shape and extends along the direction (X direction) in which the rotation axis A3 extends. The cylindrical portion 332b includes external teeth that mesh with internal teeth of the circular spline 232c. The flange 332c has an annular shape and extends outward (to a side away from the center of rotation) from an end of the cylindrical portion 332b on the motor 231 side (X2 direction side). The circular spline 232c has an annular shape and includes the internal teeth that mesh with the external teeth of the flexspline 232b.

The flexspline 232b, which is the fixed portion of the speed reducer 232, is attached to the second arm 202 via the holding member 236 by a fixing tool such as a screw (not shown) at the flange 332c. Furthermore, the circular spline 232c, which is the output of the speed reducer 232, is attached to the third arm 3 via the holding member 235 by a fixing tool such as a screw (not shown).

The brake 233 holds the motor 231. The brake 233 is a non-excitation actuated electromagnetic brake that holds the motor 231 when it is not energized and releases the holding of the motor 231 when it is energized. A brake hub 233a of the brake 233 is attached to a distal end of the motor shaft 231b by being fixed to the motor shaft 231b by a set screw. A main body 233b of the brake 233 is attached to a brake holder 236a of the holding member 236 by a fixing tool such as a screw (not shown). The oil seal 234 seals the grease of the speed reducer 232. The oil seal 234 is mounted on the motor shaft 231b. The oil seal 234 is held by an oil seal holder 236b of the holding member 236.

The brake 233 and the oil seal 234 are provided outside the housing 231a of the motor 231 separately from the motor 231. The brake 233 and the oil seal 234 are arranged outside the housing 231a of the motor 231 and the wave generator 232a of the speed reducer 232 in the direction (X direction) in which the rotation axis A3 extends. The brake 233 and the oil seal 234 are arranged on the side (X1 direction side) opposite to the motor 231 side relative to the wave generator 232a of the speed reducer 232. The oil seal 234 and the brake 233 are arranged in this order from the motor 231 side (X2 direction side) toward the speed reducer 232 side (X1 direction side).

The holding members 235 and 236 integrally hold the motor 231, the speed reducer 232, the brake 233, and the oil seal 234. Specifically, the motor 231 is attached to the holding member 235 by a fixing tool such as a screw (not shown). The speed reducer 232 is attached to the holding member 235 by a fixing tool 207b such as a screw. The brake 233 is attached to the brake holder 236a of the holding member 236 by a fixing tool such as a screw (not shown). The oil seal 234 is held by the oil seal holder 236b of the holding member 236. While integrally including the motor 231, the speed reducer 232, the brake 233, the oil seal 234, and the holding members 235 and 236, the third joint axis portion unit 230a is attached to the third arm 3 via the holding member 235 by a fixing tool such as a screw (not shown) and is attached to the second arm 202 via the holding member 236 by a fixing tool such as a screw (not shown).

The speed reducer 232 includes a recess 232e that is recessed along the direction (X direction) in which the rotation axis A3 extends. The recess 232e is defined by at least the wave generator 232a, the flexspline 232b, the circular spline 232c, and the bearing 232d. Specifically, the bottom of the recess 232e is defined by the wave generator 232a. A side of the recess 232e is defined by the flexspline 232b, the circular spline 232c, and the bearing 232d. The speed reducer 232 includes the recess 232e on the side (X1 direction side) opposite to the motor 231 side. That is, the recess 232e is recessed from the speed reducer 232 side (X1 direction side) toward the motor 231 side (X2 direction side).

At least a portion (a portion on the X2 direction side) of the brake 233 and the oil seal 234 are arranged inside the recess 232e. That is, at least the portion of the brake 233 and the oil seal 234 are arranged so as to fit inside the recess 232e. Thus, at least the portion of the brake 233 and the oil seal 234 can be arranged using the recess 232e, and thus the third joint axis portion unit 230a can be downsized in the axial direction (X direction) as compared with a case in which a motor with a brake is used for the third joint axis portion unit 230a. At least the portion of the brake 233 and the oil seal 234 overlap the recess 232e (the cylindrical portion 332b of the flexspline 232b and the bearing 232d) as viewed in a direction (such as the Y direction or Z direction) orthogonal to the direction in which the rotation axis A3 extends.

Similarly, the brake holder 236a and the oil seal holder 236b of the holding member 236 are arranged inside the recess 232e. That is, the brake holder 236a and the oil seal holder 236b are arranged so as to fit inside the recess 232e. The brake holder 236a and the oil seal holder 236b overlap the recess 232e (the cylindrical portion 332b of the flexspline 232b and the bearing 232d) as viewed in the direction (such as the Y direction or Z direction) orthogonal to the direction in which the rotation axis A3 extends.

In the second embodiment, the first arm body 202a of the second arm 202 includes a brake maintenance cover 202c at a position facing the brake 233. The brake maintenance cover 202c is detachably provided on the first arm body 202a of the second arm 202. When the brake maintenance cover 202c is removed from the first arm body 202a of the second arm 202, the brake 233 is exposed to the outside together with the fixing tool of the brake 233, for example. Thus, maintenance of the brake 233 such as replacement of the brake 233 can be easily performed. When attached to the first arm body 202a of the second arm 202, the brake maintenance cover 202c covers the brake 233. The brake 233 is arranged in the vicinity of or adjacent to the outer surface of the first arm body 202a of the second arm 202.

Configuration of Second Arm

In the second embodiment, as shown in FIGS. 17 and 22, the first arm body 202a of the second arm 202 includes a connection 202d to connect the first arm body 202a to a second arm body 2b. The connection 202d has a hollow structure, and a brake line 223c of the brake 223 and a brake line 233c of the brake 233 can be inserted into a hollow portion of the connection 202d. The brake line 223c and the brake line 233c are arranged in a second joint axis portion wiring unit 70a via the hollow portion of the connection 202d.

The first arm body 202a of the second arm 202 includes a brake line maintenance cover 202e at a position facing the connection 202d. The brake line maintenance cover 202e is detachably provided on the first arm body 202a of the second arm 202. When the brake line maintenance cover 202e is removed from the first arm body 202a of the second arm 202, the brake lines 223c and 233c are exposed to the outside. Thus, the brake lines 223c and 233c can be easily maintained. When attached to the first arm body 202a of the second arm 202, the brake line maintenance cover 202e covers the brake lines 223c and 233c. The brake lines 223c and 233c are arranged in the vicinity of or adjacent to the outer surface of the first arm body 202a of the second arm 202.

The remaining configurations of the second embodiment are similar to those of the first embodiment.

Advantageous Effects of Second Embodiment

According to the second embodiment, the following advantageous effects are achieved.

According to the second embodiment, the vertical articulated robot 200 is configured as described above. Accordingly, the rotational speed and rotational acceleration of the joint axis portion unit 10a (220a, 230a, 40a, 50a) can be increased while the joint axis portion unit 10a (220a, 230a, 40a, 50a) is downsized, similarly to the first embodiment.

According to the second embodiment, as described above, the joint axis portion unit 220a (230a) integrally includes the motor 221 (231), which is a motor that does not include a brake, the speed reducer 222 (232), and the brake 223 (233) arranged on the side opposite to the motor 221 (231) side relative to the speed reducer 222 (232) to hold the motor 221 (231). Accordingly, the motor 221 (231) can be downsized as compared with a case in which the motor 221 (231) is a motor with a brake. Furthermore, the brake 223 (233) can be arranged on the side opposite to the motor 221 (231) side, and thus the brake 223 (233) can be arranged as close to a surface of the arm 202 as possible. Consequently, the brake 223 (233) can be arranged at a position at which maintenance work for the brake such as replacement of the brake can be easily performed.

The remaining advantageous effects of the second embodiment are similar to those of the first embodiment.

Modified Examples

The embodiments disclosed this time must be considered as illustrative in all points and not restrictive. The scope of the present disclosure is not shown by the above description of the embodiments but by the scope of claims for patent, and all modifications (modified examples) within the meaning and scope equivalent to the scope of claims for patent are further included.

For example, while the example in which the vertical articulated robot is a six-axis robot having six degrees of freedom has been shown in each of the aforementioned first and second embodiments, the present disclosure is not restricted to this. In the present disclosure, the vertical articulated robot may be a robot having five or less degrees of freedom, or a robot having seven or more degrees of freedom.

While the example in which the fifth joint axis portion (near distal joint axis portion) and the sixth joint axis portion (distal joint axis portion) are formed as a unit integrally including the fifth joint axis portion and the sixth joint axis portion has been shown in each of the aforementioned first and second embodiments, the present disclosure is not restricted to this. In the present disclosure, the near distal joint axis portion and the distal joint axis portion may be formed as separate units.

While the example in which the sixth joint axis portion (distal joint axis portion) includes the motor and the speed reducer connected to the motor shaft of the motor via the belt mechanism has been shown in each of the aforementioned first and second embodiments, the present disclosure is not restricted to this. In the present disclosure, the distal joint axis portion may include a motor and a speed reducer directly connected to a motor shaft of the motor.

While the example in which each of the second joint axis portion wiring unit and the fourth joint axis portion wiring unit also serves as the arm has been shown in each of the aforementioned first and second embodiments, the present disclosure is not restricted to this. In the present disclosure, the wiring unit may be provided separately from the arm.

While the example in which the second arm includes the pair of arm bodies including the first arm body and the second arm body has been shown in each of the aforementioned first and second embodiments, the present disclosure is not restricted to this. In the present disclosure, the second arm may include a single arm body.

What is claimed is:

1. A vertical articulated robot comprising:
   a plurality of arms;
   a plurality of joint axis portion units configured to rotationally drive the plurality of arms; and
   a wiring unit configured to allow wiring portions of the plurality of joint axis portion units to be arranged therein; wherein
   at least one of the plurality of joint axis portion units other than a distal joint axis portion unit to which a tool is attached integrally includes a first motor including a solid first motor shaft, and a first speed reducer directly connected to the first motor shaft not via a belt mechanism, and
   the distal joint axis portion unit includes
   a distal joint axis portion to which the tool is attached, the distal joint axis portion having a second motor, and
   a near distal joint axis portion connected to a side opposite to a distal side of the distal joint axis portion, the near distal joint axis portion having a third motor, wherein
   the distal joint axis portion unit is a unit integrally including the distal joint axis portion and the near distal joint axis portion, and the second motor and the third motor are attached to the near distal joint axis portion of the unit.

2. The vertical articulated robot according to claim 1, wherein
   the second motor includes a second motor shaft and a second speed reducer connected to the second motor shaft via a belt mechanism;
   the third motor includes a solid third motor shaft and a third speed reducer directly connected to the third motor shaft; and
   the distal joint axis portion unit integrally includes the second motor, the belt mechanism, the second speed reducer, the third motor, and the third speed reducer.

3. The vertical articulated robot according to claim 2, wherein the wiring unit is configured to also serve as at least one of the plurality of arms.

4. The vertical articulated robot according to claim 2, wherein
   the first motor includes no brake,
   at least one of the plurality of joint axis portion units includes the distal joint axis portion unit,
   the at least one of the plurality of joint axis portion units further integrally includes the first speed reducer, and a brake arranged on the first motor side relative to the first speed reducer, the brake being configured to hold the first motor.

5. The vertical articulated robot according to claim 2, wherein the first motor is a motor including no brake, and wherein the at least one of the plurality of joint axis portion units further integrally includes the first speed reducer, and a brake arranged on a side opposite to the first motor side relative to the first speed reducer, the brake being configured to hold the first motor.

6. The vertical articulated robot according to claim 1, wherein the wiring unit is configured to also serve as at least one of the plurality of arms.

7. The vertical articulated robot according to claim 6, wherein the wiring unit integrally includes a wiring arrangement portion and an exterior portion configured to hold the wiring arrangement portion, the wiring unit exterior portion being configured to also serve as an exterior portion of at least one of the plurality of arms.

8. The vertical articulated robot according to claim 7, wherein
   one of the plurality of arms includes a pair of arm bodies including a first arm body configured to receive a driving force from the first motor, and a second arm body configured to face the first arm body, the second arm body being configured to receive no driving force from the first motor; and
   the wiring unit is configured to also serve as the second arm body of the pair of arm bodies.

9. The vertical articulated robot according to claim 7, wherein the first motor includes no brake,
at least one of the plurality of joint axis portion units includes the distal joint axis portion unit,
the at least one of the plurality of joint axis portion units further integrally includes the first speed reducer, and a brake arranged on the first motor side relative to the first speed reducer, the brake being configured to hold the first motor.

10. The vertical articulated robot according to claim 7, wherein the first motor is a motor including no brake, and wherein the at least one of the plurality of joint axis portion units further integrally includes the first speed reducer, and a brake arranged on a side opposite to the first motor side relative to the first speed reducer, the brake being configured to hold the first motor.

11. The vertical articulated robot according to claim 6, wherein one of the plurality of arms includes a pair of arm bodies including a first arm body configured to receive a driving force from the first motor, and a second arm body configured to face the first arm body, the second arm body being configured to receive no driving force from the first motor; and
the wiring unit is configured to also serve as the second arm body of the pair of arm bodies.

12. The vertical articulated robot according to claim 6, wherein
the first motor includes no brake,
at least one of the plurality of joint axis portion units includes the distal joint axis portion unit,
the at least one of the plurality of joint axis portion units further integrally includes the first speed reducer, and a brake arranged on the first motor side relative to the first speed reducer, the brake being configured to hold the first motor.

13. The vertical articulated robot according to claim 6, wherein the first motor is a motor including no brake, and wherein the at least one of the plurality of joint axis portion units further integrally includes the first speed reducer, and a brake arranged on a side opposite to the first motor side relative to the first speed reducer, the brake being configured to hold the first motor.

14. The vertical articulated robot according to claim 1, wherein
the first motor includes no brake,
at least one of the plurality of joint axis portion units includes the distal joint axis portion unit,
the at least one of the plurality of joint axis portion units further integrally includes the first speed reducer, and a brake arranged on the first motor side relative to the first speed reducer, the brake being configured to hold the first motor.

15. The vertical articulated robot according to claim 1, wherein the first motor is a motor including no brake, and wherein the at least one of the plurality of joint axis portion units further integrally includes the first speed reducer, and a brake arranged on a side opposite to the first motor side relative to the first speed reducer, the brake being configured to hold the first motor.

16. A vertical articulated robot comprising:
a plurality of arms;
a plurality of joint axis portion units configured to rotationally drive the plurality of arms; and
a wiring unit configured to allow wiring portions of the plurality of joint axis portion units to be arranged therein; wherein
at least one of the plurality of joint axis portion units other than a distal joint axis portion unit to which a tool is attached integrally includes a first motor including a solid first motor shaft, and a first speed reducer directly connected to the first motor shaft not via a belt mechanism; wherein
the first motor includes no brake, and
at least one of the plurality of joint axis portion units includes the distal joint axis portion unit; and
the at least one of the plurality of joint axis portion units integrally includes a brake provided separately from the first motor, the brake being configured to hold the first motor,
the distal joint axis portion unit includes
a distal joint axis portion to which the tool is attached, the distal joint axis portion having a second motor, and
a near distal joint axis portion connected to a side opposite to a distal side of the distal joint axis portion, the near distal joint axis portion having a third motor, wherein
the distal joint axis portion unit is a unit integrally including the distal joint axis portion and the near distal joint axis portion, and the second motor and the third motor are attached to the near distal joint axis portion of the unit.

* * * * *